United States Patent
Feyh et al.

(10) Patent No.: US 6,396,254 B1
(45) Date of Patent: May 28, 2002

(54) READ CHANNEL

(75) Inventors: German Stefan Otto Feyh, Boulder; Christopher Lyle Painter, Lafayette; Lisa Chaya Sundell, Boulder; William G. Bliss, Thornton, all of CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/454,626

(22) Filed: Dec. 6, 1999

(51) Int. Cl.[7] ................................................. G11B 5/09
(52) U.S. Cl. ........................ 324/76.19; 360/46; 360/51
(58) Field of Search .......................... 324/158.1, 76.19, 324/76.29; 360/46, 51; 369/59; 341/158.1; 375/262, 265, 346

(56) References Cited

U.S. PATENT DOCUMENTS

| | | | | |
|---|---|---|---|---|
| 5,521,767 A | * | 5/1996 | Weng et al. | 360/46 |
| 5,734,680 A | * | 3/1998 | Moore et al. | 375/263 |
| 5,822,143 A | * | 10/1998 | Cloke et al. | 360/65 |
| 5,987,562 A | * | 11/1999 | Glover | 711/4 |
| 5,991,107 A | * | 11/1999 | Behrens et al. | 360/46 |
| 6,037,886 A | * | 3/2000 | Staszewski et al. | 341/139 |
| 6,038,091 A | * | 3/2000 | Reed et al. | 360/46 |
| 6,115,198 A | * | 9/2000 | Reed et al. | 360/46 |
| 6,144,513 A | * | 11/2000 | Reed et al. | 360/51 |
| 6,172,637 B1 | * | 1/2001 | Kugler | 341/158 |
| 6,185,173 B1 | * | 2/2001 | Livingston et al. | 369/59 |
| 6,201,177 B1 | * | 3/2001 | Reed | 369/59 |

OTHER PUBLICATIONS

K.A.S. Immink, "Codes for Mass Data Storage Systems," Shannon Foundation Publishers, The Netherlands, 1999, ISBN 90-74249-23-X.

* cited by examiner

Primary Examiner—Michael J. Sherry
Assistant Examiner—Jimmy Nguyen
(74) Attorney, Agent, or Firm—Dan A. Shifrin, Esq.

(57) ABSTRACT

An improved read channel for storage and communication application particularly useful in optical storage applications. The improved read channel includes a Viterbi sequence detector tuned to a preferred partial response target well suited to sensing of pulses in the waveforms typical of optical storage read heads. In particular, the read channel of the present invention implements pulse and sequence detection for a partial response target having a spectral null at the Nyquist frequency and having a relative minimum between zero and the Nyquist frequency. In other words, the partial response target of the improved read channel is not a monotonic decreasing function between zero and the Nyquist frequency as is known in present read channels. More specifically, in the preferred embodiment, the partial response target of the read channel includes a spectral null at the Nyquist frequency and another spectral null at half the Nyquist frequency. The improved read channel further includes state logic in the Viterbi sequence detector that processes two discrete samples in parallel. Parallel processing of multiple samples improves the read channel performance for application in ever increasing bit density storage and communication applications. The preferred embodiment of the present invention also includes selectable waveform shaping features to improve the flexibility of utilizing the read channel in a variety of applications. Specifically, the present invention includes a reshaping filter, a prefilter and DC offset circuit that may be selected to adapt the waveform as required for application to the slicer and to adapt as required for application to the sequence detector.

10 Claims, 13 Drawing Sheets

READ CHANNEL

BACKGROUND OF THE INVENTION

1. Field of the Invention

This invention relates generally to detection and decoding of encoded digital information stored on a storage medium or received from a communication medium. In particular the present invention relates to an improved maximum likelihood sequence detector applicable to such storage or communication applications.

2. Discussion of Related Art

Storage systems store and retrieve data on a storage medium. Communications systems transmit and receive data via a communication medium. Storage and communication systems utilize similar techniques to encode data for storage and retrieval or for transmission and reception. Data is encoded into a form in which it may be easily manipulated in such storage or communication systems. Most modern applications of such systems encode data as numeric or digital information. Discrete numeric values are used to represent user data.

The storage medium or communication medium does not directly manipulate such digital data. Rather, these media store or transmit analog signals representative of the digital data. For example, computer systems often use magnetic storage media on which encoded digital information is represented as magnetic flux changes. Certain identified sequences of flux changes, when detected, are representative of corresponding sequences of digital data. In like manner, communication systems receive information transmitted via the communication medium such as electromagnetic radiation (i.e., radio or microwave frequency radiation). Certain sequences of changes in the communication medium state are representative of corresponding digital data transmitted between a transmitter and receiver.

The data embodied in the analog signals of the medium are then received or retrieved to decode the signals and reproduce the encoded digital data. In a storage system in particular, the encoded signals are said to be read from the storage medium. In a communication system, the encoded signals are usually referred to as being received from the transmitter. A circuit that reads or receives the encoded data and reproduces the original digital data is often referred to as a read channel. In general, a read channel includes a transducer component that senses the analog signal and digital processing components that detect sequences of changes in the sensed signal that represent encoded digital data. For example, a read channel in a magnetic storage device includes a magnetic read head that senses the magnetic flux changes and produces electric current therefrom. The electric signal from the read head is a continuous analog waveform. The digital data encoded in such an analog continuous waveform must therefore be detected and decoded from the essentially continuous analog signal. In general, certain peaks in the continuous waveform represent the encoded digital data.

In an ideal theoretical environment, each magnetic flux change could be representative of a corresponding bit (binary digit—a value of zero or one). Sequences of such zeros and ones may then be recorded on and retrieved from the magnetic medium as sequences of adjacent magnetic flux changes. However, in practice as the density of such recorded information increases, the physical proximity of one recorded bit to the next adjacent bit tends to cause interference between the adjacent bits. This interference is often referred to as inter-symbol interference (or ISI). In storage applications, adjacent magnetic flux changes can cause such inter-symbol interference. Optical storage applications are also affected by such ISI concerns as the physical proximity of optically encoded bits on a storage medium is decreased to thereby increase storage density. Similar interference issues affect communication applications as distinct from storage applications. The speed of signals applied to a communication medium can cause interference problems in sensors adapted to receive the signals.

It is known in storage and communication arts to encode the digital data so that only specified sequences of transitions of the medium are permitted. These permitted sequences are known to reduce the effects of inter-symbol interference. In particular, it is common to use run-length-limited (RLL) encoding of the digital data to generate an RLL-encoded stream of bits to be read by the read channel digital processing means. This encoded stream of bits is often referred to as channel bits in that they represent the stream of bits encountered by the read channel components of the device. It may be desirable in certain applications to assure that there be no fewer than "d+1" bit times between any two transitions of the medium. This constraint can help keep interference effects among the pulses caused by the analog read channel sensing of transitions to a manageable level. On the other hand it is often the case that timing information is extracted from the read channel sensed pulses to help maintain synchronization in reading lengthy sequences of such pulses. It may also be desirable therefore that there be no more than "k" zeros between any two transitions of the medium. In other words, there must be a medium transition at least every k+1 bit times.

An RLL(d,k) code is used to encode an arbitrary set of data bits into a stream of channel bits such that the encoded channel bits satisfy the "d" and "k" constraints. A wide variety of encodings that satisfy a given (d,k) constraint may be used and several such encodings are well known in the storage and communication arts.

Read channels associated with storage devices or communication devices sense the encoded information stored or transmitted on the medium and decode the original data bits from the sensed pulses and the RLL (or other) encoding employed. In general, read channels attempt to sense pulses read from the medium by periodically sampling the present value of a transducer adapted to sense the recorded or transmitted medium state changes. Each periodic sample of the continuous waveform signal produced by a transducer is a digital value indicative of the amplitude of the continuous signal at a corresponding sample time. A sequence of such samples are then used by digital signal processing means to detect state transitions and hence the encoded channel bits and corresponding user data bits in the continuous signal represented by the sampled values.

Due to the analog nature of the waveform sensed by the read head (or receiver) and due to the inter-symbol interference problems noted above, it is a problem to accurately sense and decode the encoded user data bits. The problem is particularly exacerbated as communication speed or storage density increases.

To partially resolve such problems, it is known to use sequence detectors to sense particular expected sequences of pulses rather than attempting to detect each discrete individual pulse in the sampled waveform. In particular, Viterbi sequence detectors do not attempt to decide whether or not a particular medium transition has occurred immediately upon receipt of sample(s) that correspond to that transition. Rather, as samples are taken from the analog read signal, the Viterbi sequence detector keeps a running tally of the error between the actual sample sequence and each of one or more possible expected sequences corresponding to acceptable codes for the particular RLL encoding employed. The running error tally is maintained for each of a number of possible encoded sequences. As more samples are gathered, less likely sequences are pruned from the "tree" of possible sequences. The maximum length of possible sequences that need be tracked may be constrained to a particular value for a particular application and encoding. When so constrained, the Viterbi sequence detector may eventually select a sequence having a high degree of probability as the detected sequence of encoded channel bits.

It is recently known in the art to apply such Viterbi sequence detectors to read channels used in optical storage media. Optical storage media record encoded data using optical techniques whereby the reflectivity (or other optical parameters) of a spot on the medium is altered to record a bit value. As in magnetic storage applications, sequences of such recorded bits are arranged on the medium so that the recorded bits pass under an optical sensor as the medium is rotated. A laser light source aimed at the medium is reflected back to the optical sensor. The output of the optical sensor is coupled to the signal processing means of a read channel in like manner to that of known magnetic recording techniques. A Viterbi sequence detector is then used in conjunction with other functional blocks of the read channel to sense most likely sequences of encoded channel bits.

The sampling of the continuous waveform and the Viterbi sequence detector are both tuned to recognize pulses in the continuous waveform that closely model an ideal, expected pulse shape—a partial response target. Because of differences in the recording and associated sensing techniques, actual continuous waveform pulses for magnetic storage devices are notably different from those of optical storage devices. If a partial response target is not well tuned to the actual pulse shape and timing, the Viterbi sequence detector will be less capable than desired of accurately detecting sequences of encoded channel bits. As noted above, such problems are magnified when storage density or communication speeds are increased.

It is known in signal processing to describe a waveform as a superposition combination of a sequence of discrete time sampled values of the waveform. An algebraic notation has been developed to describe such discrete time sampled systems.

In this notation, "$D^N$" denotes a discrete sampled value "D" of the waveform delayed by "W" sample periods. In other words $D^0$ (typically denoted simply as "1") is the present sample value. D or $D^1$ is the previous discrete sampled value (sample once delayed), $D^2$ is a next previous sampled value (sample twice delayed), Do is a next older previous sampled value, etc. The superposition of such discrete sampled values is then described by algebraic notation as polynomials having a variable D. Products, sums and differences of combinations of $D^N$ sampled values therefore represent various partial response target pulse shapes.

In view of the above discussion, it is evident that a need exists for a read channel tuned to a preferred partial response target more closely matched to the pulses generated in optical storage read channel applications.

Further as noted above, as storage density increases or as communication speeds increase, the demands on read channel digital signal processing speed increases proportionally. In particular, Viterbi sequence detectors need to recognize potentially complex sequences at ever faster speeds. Further, sequences to be recognized by the sequence detector may be more complex in, for example, optical storage applications where the partial response target may require more complex sequences be recognized.

In view of the above discussion, it is evident that a need exists for improved performance in maximum likelihood sequence detectors as applied in storage or communication read channel technologies.

As read channels are now being applied to optical storage systems as well as magnetic storage systems and communication systems, it is a problem that each application tends to require special features and digital signal processing. Such special requirements have been handled by use of read channels customized to each particular application. It is therefore a problem that customized versions of read channel circuits proliferate in the industry. Such proliferation of slight variations of read channel designs overly complicates the task of user applications and designs. For example, a single user may utilize read channels for various types of media within a single storage device. In such cases, present read channel designs would require two distinct read channel circuits to optimally manipulate various types of storage media.

In particular, it is a problem in read channels to provide flexibility in the filtering or shaping of input signals. It may be preferred that sampled signals be biased or filtered in one manner for a first purpose in the read channel and in a second manner for a another purpose within the read channel. Specifically, a circuit referred to as a slicer is often used to detect when the sampled values cross a specific threshold value. The sequence detector, on the other hand, processes sequences of sampled values to detect sequences of pulses and to decode data encoded therein. These two functions of the read channel device may benefit from different shaping of the sampled waveform represented by the sequence of sampled values. A slicer circuit provides rapid detection of the sampled signals but may have a high bit error rate. In other words, it is fast at detecting sampled waveforms but not accurate. This may be useful for certain functional blocks such as timing recovery where encoded data on a storage medium is intended to initialize, reset or operate the functional block. A typical example may be data sequences encoded on the storage medium intended to initialize and operate a phase lock loop. By contrast, a sequence detector is very accurate at detecting sampled waveforms but imposes a significant delay (latency) on processing the sample waveform values. This form of detection may be more useful in sampling stored system or user data where accuracy is more important than the latency of detection.

Present read channel designs do not offer the flexibility to perform different waveform shaping for different processing purposes within the read channel.

In view of the above discussion, it is evident that a need exists for an improved read channel design that provides for flexibility in applications and in particular provides for selectable waveform shaping features to be applied to different functions within the read channel.

SUMMARY OF THE INVENTION

The present invention solves the above and other problems, thereby advancing the state of the useful arts, by providing an improved read channel design which provides, at once, improved sequence detection through use of a partial response target well suited to optical storage applications, improved performance in sequence detection for high performance applications, and flexible design permitting the features of the read channel to be applied to a wide variety of applications.

A first aspect of the present invention provides for adaptation of the read channel to a partial response target well suited to pulse waveforms typical of optical storage applications. In general, the target magnitude response of the invention is not a monotonic decreasing function. Rather, the partial response target of the invention includes at least one relative minimum in the power spectrum of the ideal response. In the preferred embodiment, the partial response target has a spectral null between zero and the Nyquist frequency ($F_s/2$, half the sampling frequency). Such a partial response target defines a first portion of the partial response target and a second portion with the spectral null between zero and $F_s/2$. It has been observed that the first portion of the partial response target is useful to more closely match the ideal response of pulses read from an optical storage medium and that the second portion is largely irrelevant with respect to detecting sequences of pulses sensed from optical media.

Still more specifically, in the preferred embodiment, the scaled target polynomial as expressed in D-transform notation is:

$$H(D)=8(1+D+D2+D)=8(1+D)(1+D^2)$$

This target is referred to herein as PR1 FS4 because it is a partial response target having spectral nulls at both the Nyquist frequency ($F_s/2$) and half the Nyquist frequency ($F_s/4$).

In a second aspect of the invention, a Viterbi sequence detector is structured so as to process two samples at once. Block processing of multiple samples improves the performance of the sequence detector so as to accommodate higher data rates common in present communication and high-density storage applications. In general, Viterbi sequence detectors include logic to track the likelihood of multiple possible candidate sequences each of which might correspond to the sequence of waveform samples. The computational complexity of the sequence detector is therefore primarily a function of the number of discrete samples used to detect a pulse (i.e., the number of delayed samples in the superposition equation represented by the D-transform notation polynomial). Most sequence detectors correspond to state machines in which the number of states grows (exponentially) with the complexity of the D-transform polynomial. Increasing the number of states therefore increases the computational complexity of the sequence detector by increasing the number of candidate sequences that must be retained at each step and the amount of branch and path metric computation.

The present invention includes sequence detection using multiple samples and includes features to simplify the computational complexity of the state machine implementing the sequence detector. The present invention therefore provides block-oriented processing of multiple samples to improve sequence detection for high performance applications while reducing the computational complexity of such processing.

A third aspect of the present invention improves the flexibility in utilizing the read channel of the present invention in a variety of applications. In particular, the present invention provides for selectively applying additional filtering to equalize signals to a preferred shape for the slicer and to a preferred shape for application to the sequence detector. In like manner, the present invention further provides for selectively applying a DC offset to bias signals to a preferred level for application to the slicer and to a preferred level for application to the sequence detector.

DETAILED DESCRIPTION OF THE PREFERRED EMBODIMENTS

Figure 1:
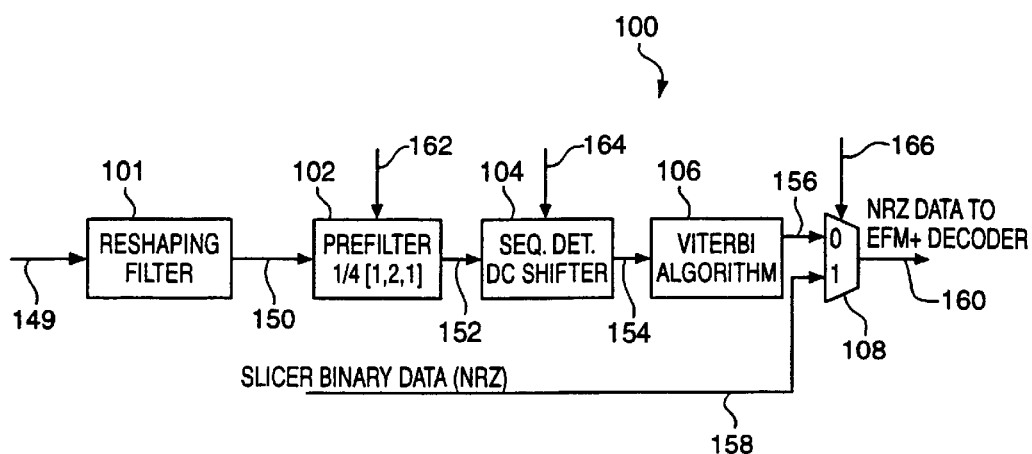
FIG. 1 is a block diagram of a portion of a read channel in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 4:
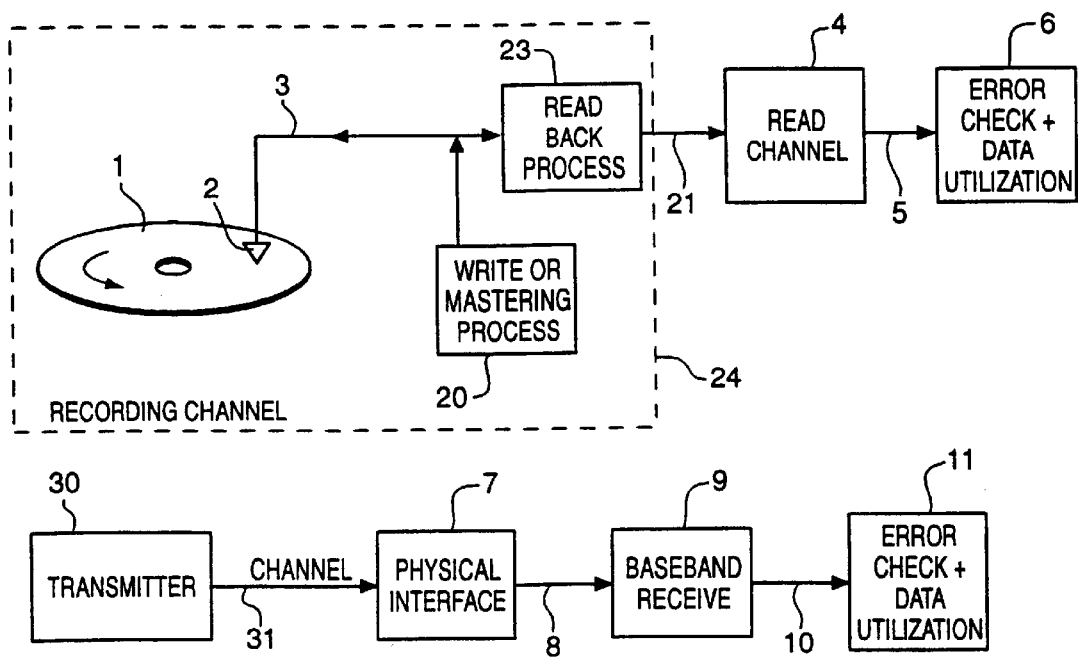
FIG. 4 is a block diagram of typical read channel applications as generally known in the art.

FIG. 4 is a block diagram depicting typical applications of the present invention as generally known in the art. As applied to storage systems, a storage medium 1 (often a rotating magnetic or optical medium) stores encoded data sequences as physical changes to the storage medium 1. For example, the physical changes may be in the form of magnetic flux changes or sequences of positions having varying optical properties. A write or mastering process 20 applies signals via path 3 to a read/write means 2 (usually a device capable of reading and writing information on the medium) to record desired changes in the storage medium. Readback process 23 is used to sense the physical changes on the storage medium 1 using read/write means 2 and convert them to signals used in the reading of information stored on the storage medium 1. In the storage arts, write or mastering process 20, path 3, read/write means 2 and readback process 23 are generally referred to collectively as the recording channel 24.

Read/write means 2 (also referred to herein as "sensor") senses the encoded data optically or magnetically and applies the sensed signals via path 3 to read process 23 and thence to read channel 4 via path 21. Read channel 4 decodes the sequences of changes in the signals "read" from the storage medium 1 and applies the decoded signals to an error check and data utilization device 6 via path 5.

Communication applications may apply similar techniques to transmit data between a transmitter and a receiver. Terminology of the communication application tends to differ from that of storage applications. A physical interface 7 receives data transmitted from a transmitting device 30 via channel 31. Channel 31 connecting transmitter 30 and physical interface 7 may be any of several well known media including direct electronic or optical connection as well as electromagnetic radiation transmission (i.e., radio frequency transmission).

Physical interface 7 receives the transmitted signals and, as appropriate for the medium, demodulates the received signals to baseband signals. The baseband signals are then applied via path 8 to baseband receiver 9. Baseband receiver 9 decodes the sequence of signals received by physical interface 7 and applies the decoded data via path 10 to error checking and data utilization device 11.

Baseband receiver 9 performs essentially the same functions as read channel 4. As used herein, "read channel" will refer to either storage or communication applications of a read channel or baseband receiver.

FIG. 4 is intended as merely exemplary of typical read channel applications as presently known in the art. Those skilled in the art will recognize a wide variety of equivalent applications of read channel technologies. The present invention encompasses improvements in the design and operation of a read channel and application of such an improved read channel as depicted in FIG. 4.

FIG. 1 is a block diagram providing additional details of elements within an improved read channel portion 100 in accordance with the present invention. Discrete time samples are received within read channel portion 100 on either of two paths. Path 158 represents discrete time samples derived directly from a slicer circuit as known in the art. A slicer circuit provides sampled values of a read/received signal at predetermined, periodic intervals. Such circuits are well known to those skilled in the art. Path 150 represents discrete time samples values which have been adjusted by a retiming circuit as discussed in commonly assigned U.S. Pat. No. 6,157,604 entitled "Sampled Amplitude Read Channel Employing a Baud Rate Estimator for Digital Timing Recovery in an Optical Disk Storage Device." In the preferred embodiment, retimed discrete time sample values received on path 150 are applied to the elements of the read channel portion 100 for further processing. In certain applications and conditions, sampled values direct from the slicer are preferable and therefore both are preferably provided to the read channel portion 100 in accordance with the present invention.

Read channel portion 100 of the present invention includes reshaping filter 101, prefilter 102, DC offset 104 and Viterbi sequence detector 106 for adapting the received discrete sampled signal values and for detecting encoded sequences within same. In particular, one aspect of these read channel elements, in accordance with the present invention, lies in their respective processing of multiple sampled signals in blocks. This feature is discussed in further detail below.

Reshaping filter 101 adapts a center sampled pulse shape in the sampled waveform to a side sampled for the benefit of the Viterbi sequence detector. In a center sampled waveform, the sampling phase is such that an odd number of samples represent the pulse shape with the middle sample centered at the peak of the pulse. Though such samples are useful as applied to the slicer detection (not shown), the Viterbi sequence detector target response of the present invention has an even number of samples—half on each side of the peak of the pulse. Reshaping filter 101 therefore uses averaging of pairs of samples to shift the effective phase of the sampled waveform. This reshaping shifts the samples by ½ of a sample time to, in effect, convert the center sampled pulse (odd number of samples) to a side sampled pulse (even number of samples).

Figure 22:
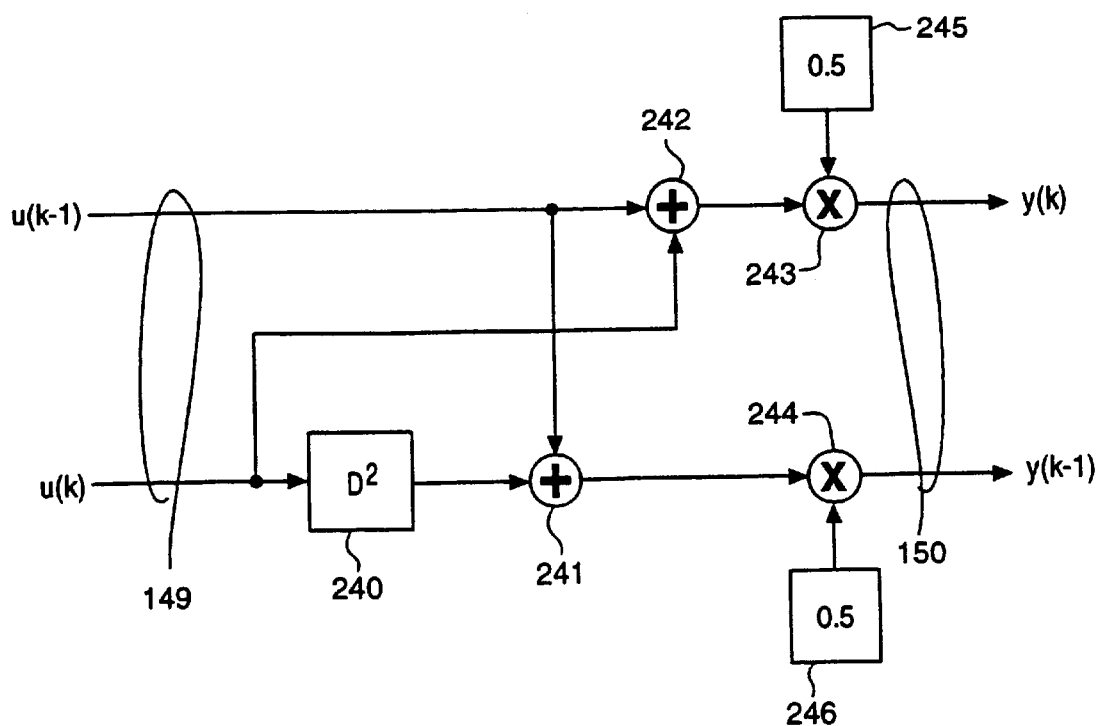
FIG. 22 is a block diagram of the reshaping filter of the read channel of FIG. 1.

As shown in more detail in FIG. 22, sample values applied to input path 149 of reshaping filter 101 are reshaped and applied as output values on path 150. The reshaping filter circuit implements the following discrete time sample equations:

$$y(k)=½(u(k)+u(k-1))$$

$$y(k-1)=½(u(k-1)+u(k-2))$$

Prefilter 102 is optionally enabled by a signal applied to path 162 to perform further low pass filtering of the sampled signal values. Sample values received as input to prefilter 102 on path 150 are filtered and applied to path 152 as output values of the filter. If prefilter 102 is disabled by a signal applied to path 162, sample values applied to input path 150 are applied to output path 152 unchanged. Details of the operation and design of prefilter 102 are discussed further herein below.

DC offset 104 is optionally enabled/disabled by a signal applied to path 164 to add a programmable offset value to the sampled signal values. Sample values received as input to DC offset 104 on path 154 are modified by the pre-programmed offset value and applied to path 154 as output values. If DC offset 104 is disabled by a signal applied to path 164, sample values applied to input path 152 are applied to output path 154 unchanged. In general, samples applied to the Viterbi sequence detector 106 may benefit from having a different baseline signal value as compared to signals that bypass the Viterbi sequence detection. For example, this is beneficial when there is non-linear distortion in the readback path. For this reason, DC offset 104 is optionally enabled and disabled by a signal applied to path 164. Details of the operation and design of DC offset 104 are discussed further herein below.

Viterbi sequence detector 106 receives filtered, offset sampled values on its input path 154 and applies decoded data sequences to its output path 156 corresponding to encoded sequences detected on its input path 154. The output of the Viterbi sequence detector 106 is then selectively combined with the slicer output values on path 158 for selection by mux 108. A first signal applied to path 166 selects the output of the Viterbi sequence detector 106 for further processing by the read channel portion 100 and a second signal applied to path 166 selects the slicer output sampled values from path 158 for further processing within read channel portion 100. The selected values are then applied by mux 108 to output path 160 for further processing within the read channel portion 100.

Figure 2:
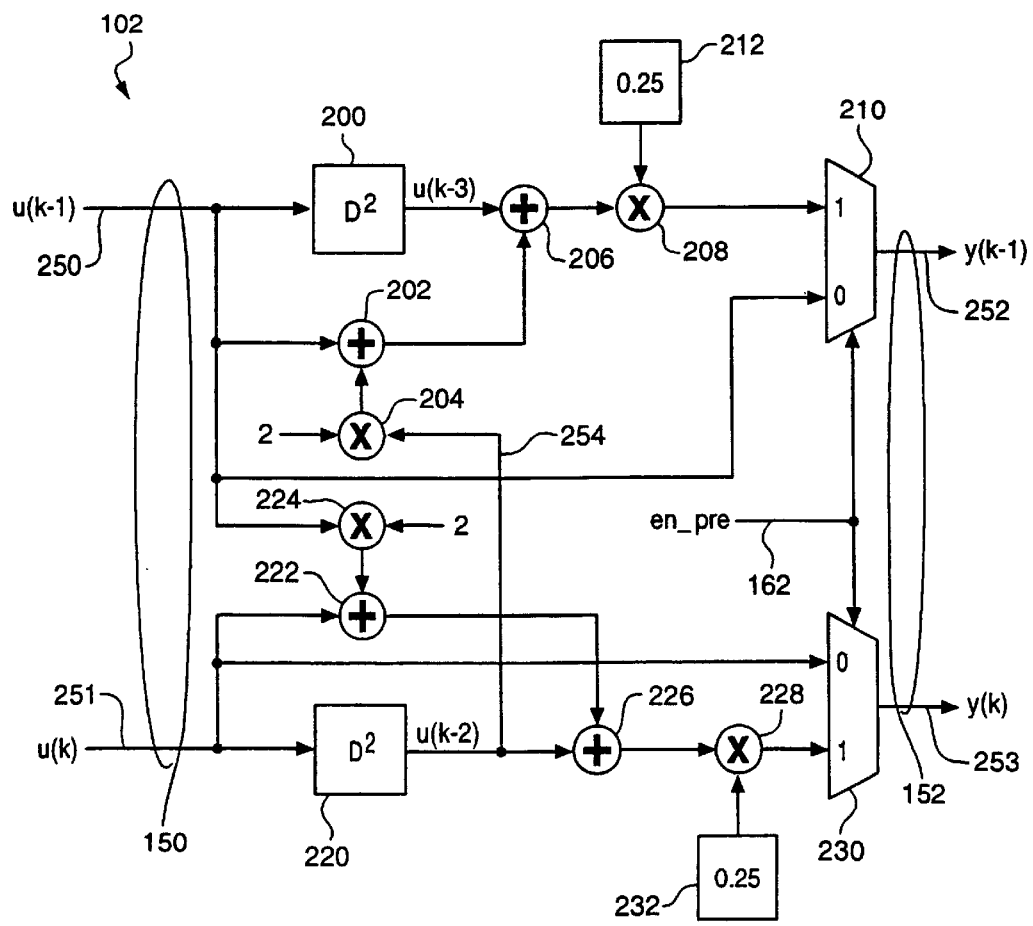
FIG. 2 is a block diagram of the selective prefilter of the read channel of the present invention.

FIG. 2 provides additional detail of the design and operation of prefilter 102 of FIG. 1. Prefilter 102 is essentially a lowpass filter (or more generally a frequency selective filter) with a unit pulse response ¼{1,2,1} (also commonly written in polynomial form as: ¼(1+2D+D$^2$)). As noted above, prefilter 102 is designed to operate on blocks of multiple signals. In the preferred embodiment, two sequential signals are applied as inputs on path 150. A first signal on path 150 is shown as u(k−1) on path 250 and a second subsequent sample value is shown as u(k) on path 251.

Filtered output values are applied to path 152 which, in turn, comprises a first sample y(k−1) on path 252 and a second sample y(k) on path 253. When a disable signal is applied to path 162, muxes 210 and 230 bypass the filtration of prefilter 102 and directly apply inputs 250 and 251 to outputs 252 and 253, respectively. Multiplication by 2 as shown by circuits 204 and 224 is preferably implemented by routing of the signal values on paths 254 and 250, respectively, to the next higher input of the adders 202 and 222, respectively. The division by 4 and rounding performed by circuits 208 and 228 is preferably implemented by adding 1 and truncating the lowest order bit twice.

The circuit of FIG. 2 processes two samples at once. The circuits of FIG. 2 are therefore clocked at half the sample rate. In particular, the two delay registers 200 and 220, are operable to effectuate a two sample clock period delay on their respective input sample values. In particular, delay register 200 receives u(k−1) as its input value and applies a twice delayed value, u(k−3), as it output value. In like manner, delay register 220 receives u(k) as its input and applies u(k−2) to its output path.

In view of the half frequency clocking of the circuit of FIG. 2, those skilled in the art will recognize that the circuit is operable to generate output values y(k−1) and y(k) on paths 252 and 253, respectively, as follows:

y(k)=¼(u(k)+2u(k−1)+u(k−2)) and y(k−1)=¼(u(k−1)+2u(k−2)+u(k−3))

Figure 3:
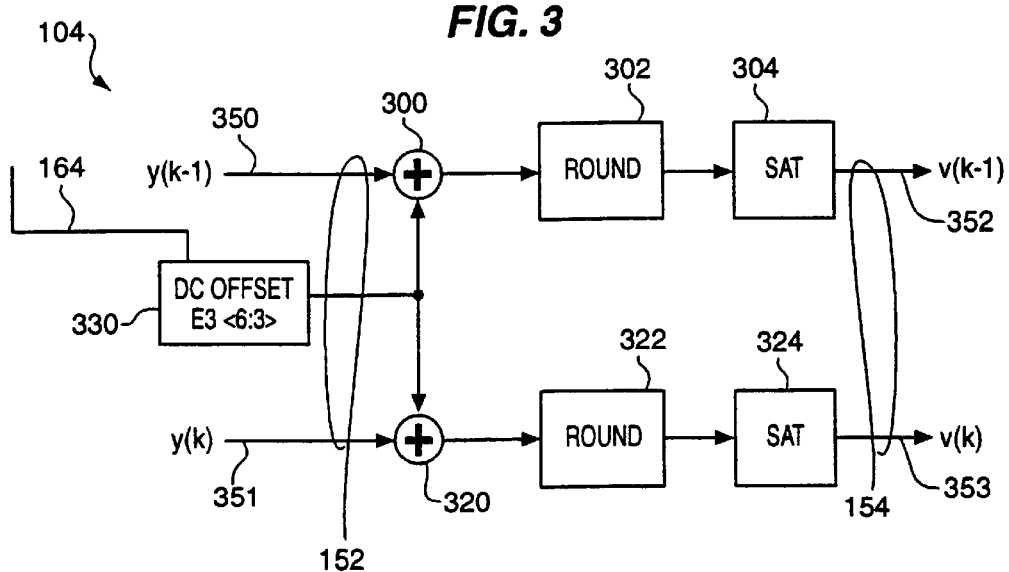
FIG. 3 is a block diagram of the programmable DC offset of the read channel of the present invention.

FIG. 3 is a block diagram providing additional details of the operation of DC offset element 104. As noted above, DC offset 104 is designed to operate on blocks of multiple signals. In the preferred embodiment, two sequential signals are applied as inputs on path 152. A first signal on path 152 is shown as y(k−1) on path 350 and a second subsequent sample value is shown as y(k) on path 351. Offset output values are applied to path 154 which, in turn, comprises a first sample v(k−1) on path 352 and a second sample v(k) on path 353.

As noted above, DC offset 104 may be "enabled" or "disabled" by a signal applied to path 164. In the preferred embodiment, the signal applied to path 164 is an offset value to be stored in DC offset register 330. Those skilled in the art will recognize that an alternative could supply a multiplexor arrangement similar to that shown above in FIG. 2 to enable or disable the DC offset 104 operation independent of the offset value in register 330. This approach may be desirable where the application of a DC offset value delayed the signal by a sample clock period or more. Such delays (latency) may be undesirable in certain applications but is not a factor in the design shown in FIG. 3. Such design choices are well known to those skilled in the art.

The Viterbi sequence detector 106 and the slicer (not shown in FIG. 1) are both sensitive to DC offsets. When a signal from, for example, a disk storage medium has significant asymmetry, both detectors work best with a "zero input reference level" that is different from the average input signal; i.e., a linear highpass filter doesn't set the correct DC level for either detector. Further, the Viterbi sequence detector works best when it has slightly less "offset correction" than does the slicer.

For example, for a typical signal with 15% asymmetry and 15% resolution, the slicer works best when the DC offset is about 15% of the peak-to-peak signal amplitude.

By contrast, the Viterbi sequence detector works best on such a signal when the DC offset is only about 12% of the peak-to-peak signal amplitude. The DC offset value to be added to the input signals on path 152 is stored in DC offset register 330. The offset value may therefore be modified for a particular slicer or Viterbi sequence detection application. Further, as noted above, the DC offset function may be bypassed by applying an appropriate signal to the enable/disable path 164.

Preferred Partial Response Target

The Viterbi algorithm assumes an input sequence that is equalized to a specific partial response target. Based on various architectural considerations, the partial response target (i.e., the unit pulse response of the perfectly equalized channel) was chosen to be $$h(k) = \begin{cases} 8 & 0 \le k \le 3 \\ 0 & \text{otherwise} \end{cases}$$

where the units are in accordance with a preferred numerical scaling.

In communications parlance, the scaled target polynomial is $$H(D)=8\cdot(1+D+D^2+D^3)=8\cdot(1+D)(1+D^2)$$

This target is called PR1 FS4 because it has spectral nulls at both the Nyquist frequency ($f_s/2$) and one half the Nyquist frequency ($f_s/4$).

If we assume that the initial output of the channel is −16, its unit step response is $$g(k) = -16 + \sum_{n=0}^{k} h(k-n).$$

Hence, the equalized response caused by a pit/land transition is {. . . , −16, −16, −8, 0, 8, 16, 16, . . . }.

This preferred partial response target is broadly characterized in that the preferred partial response target is matched to an expected received signal whose output power spectral density decreases non-monotonically across the passband of the read channel when the recording channel receives a maxentropic information sequence or in other words when the read channel receives signals derived from a maxentropic information sequence.

A Finite State Machine Model of Signal Generation

From above, we see that our idealized discrete-time channel has three memory elements. If the input sequence were completely unstructured, this would imply that there are eight possible channel states. However, because of the minimum run length constraint of the RLL(2,10) modulation code commonly used in optical recording (d=2), two of these states are disallowed. This leaves six possible states for the PR1 FS4 d=2 channel.

Figure 5:
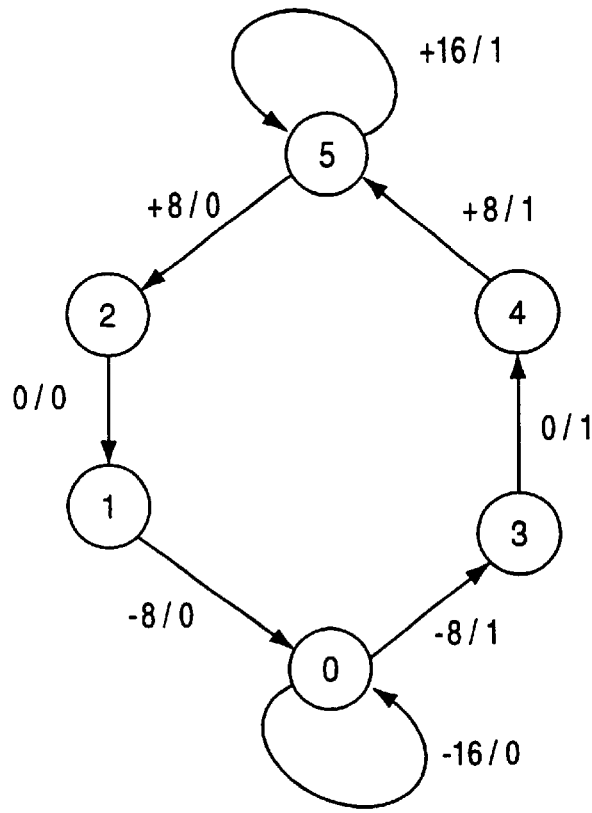
FIG. 5 is a state diagram for a single sample per update Viterbi sequence detector in accordance with the preferred partial response target of the invention.

In the context of sequence detection, it is very helpful to model the signal generation process using the discrete-time Markov chain shown in FIG. 5. The role of the sequence detector is then to estimate the sequence of states visited by the chain, and in doing this, to estimate the true NRZ sequence. States in FIG. 5 are denoted by the number within the circle representing the state. Transitions between states are depicted as arrows (branches) from a current state to a new state in response to a sensed input to the Viterbi detector.

The branch labels are of the form channel output/ channel input or, from the point of view of the detector, the branch labels are ideal detector input/ detector output.

For example, if the state of the channel is 4, and its input is 1, then its output is +8. Equivalently, if the state of the detector is 4, and its input is +8, its output is 1.

FIG. 5 depicts the state diagram for a Viterbi detector useful for the preferred partial response target processing a single sample at a time. Though a useful embodiment for the intended preferred partial response target, the preferred embodiment of the Viterbi detector in accordance with the present invention processes multiple samples at once. Details of this feature and associated changes in the state diagram are discussed herein below.

Figure 6:
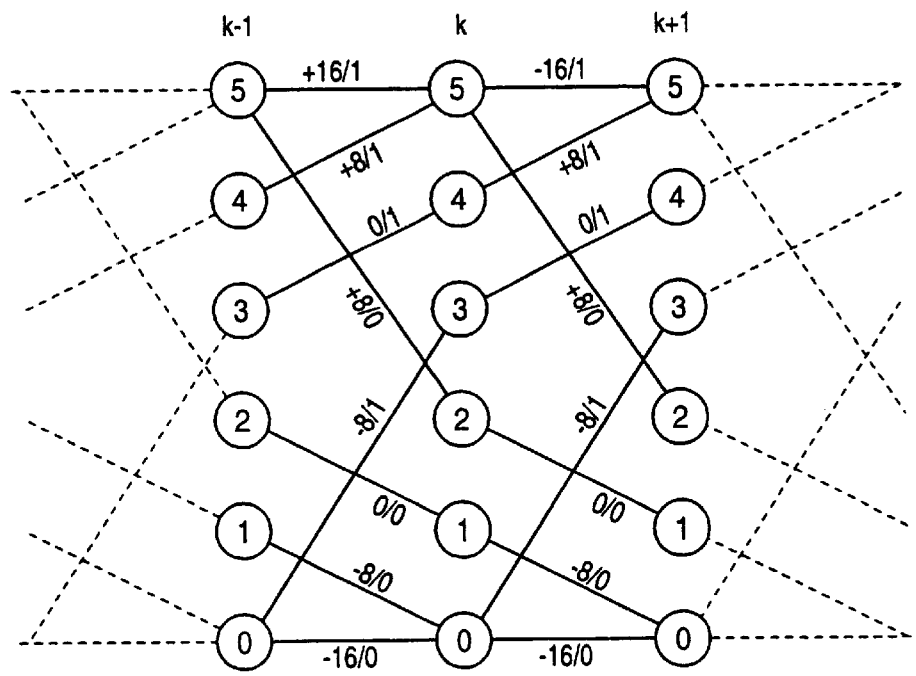
FIG. 6 is a trellis diagram for a single sample per update Viterbi sequence detector in accordance with the preferred partial response target of the present invention.

FIG. 6 shows a section of the corresponding trellis for the 6-state machine. While much less compact than the state transition diagram of FIG. 5, the trellis representation explicitly shows all possible sequences of states as time unfolds. Each column of the trellis diagram shows all possible states for a corresponding time index (k−1, k, k+1, . . . ). Each possible transition (branch) from each state is labeled as above for the state diagram with the input that causes the transition and the output generated by the detector in response to sensing that transition. Each of the possible state sequences can be visualized as a path through this trellis. If we associate an appropriate measure of length with each of the branches (state transitions) that connect the vertices (states), we can identify the path through the trellis that is shorter than all the others. The sequence of "b" values associated with the branches that make up this path are then the optimal estimate of the NRZ input sequence.

Measuring Distance

The sense in which this estimate is optimal depends on the how we measure the length of the branches. For the additive white Gaussian noise (AWGN) case, a maximum-likelihood estimate results if we define the branch metric $e_{ji}$ as follows.

$$e_{ji}(k)=[d_{ji}-r(k)]^2$$

where $r(k)$ is the received sample value at the input of the VA at time index k, and $d_{ji}$ is the ideal (i.e., perfectly equalized, noise-free) sample value associated with the transition from state j to state i. This is the length of the branch that connects node j at time k to node i at time k+1.

The length of a particular path through the trellis is the just the sum of the lengths of its constituent branches. This cumulative length is called the path metric for that path. Because of the type of metric we have chosen, if we select the sequence associated with the shortest path, we have in effect minimized the Euclidean distance between the true sequence and our estimated sequence. As mentioned previously, this constitutes the maximum-likelihood (ML) estimate if the noise is AWGN.

The Viterbi Algorithm

The Viterbi algorithm is a fast search algorithm for selecting the shortest path through a trellis. At each time step, the path metrics for the paths entering a particular node are compared. The shorter of the two paths is selected, and the longer is discarded. This selection process is repeated for each of the other nodes. The winning paths are called survivor paths, and the NRZ sequence associated with the $i^{th}$ survivor path is the $i^{th}$ survivor sequence $S_i$. For the full PR1 FS4 machine, six cumulative metrics and six survivor sequences are updated at each time step.

Given the above definition of the metric $e_{ji}$ for the branch from node j to node i, the most obvious way to update the path metrics for the single-input states $L_i$ (i.e., states 1, 2, 3 and 4 in FIGS. 5 and 6) is $$L_i(k)=L_j(k-1)+e_{ji}(k)$$

$$L_i(k)=L_j(k-1)+[d_{ji}-r(k)]^2$$

From an implementation point of view, the squaring operation is unnecessary since the term $i^2(k)$ is common to all candidate metrics and has no effect on the outcome of the minimization process. The usual implementation is then $$L_i(k)=L_j(k-1)+d_{ji}^2-2d_{ji}r(k)$$

where $L_j(k-1)$ is just the cumulative metric of the path that passes through state j and enters the state i being updated.

For the states for which there is only one incoming path (states 1 through 4), only a single metric must be calculated, and the survivor sequence $S_i$ is updated simply by concatenating the NRZ value $b_{ji}$ associated with the incoming branch onto the survivor sequence $S_i$ from the previous update cycle. That is $$S_i(k)=[S_j(k-1),b_{ji}]$$

where the comma indicates concatenation; i.e., the survivor sequence is increased in length by one sample.

For a state having two inputs (i.e., state 0 or 5), an Add-Compare-Select (ACS) operation must be performed. This entails calculation of metrics for both incoming paths and then choosing the smaller of the two. Denoting the two candidate paths as m and n, the competing path metrics at node i are $$L_{i,m}(k)=L_m(k-1)+d_{mi}^2-2d_{mi}r(k)$$

and $$L_{i,n}(k)=L_n(k-1)+d_{ni}^2-2d_{ni}r(k)$$

The winner is the smaller of the two:

$$L_i=\min[L_{i,m}(k),L_{i,n}(k)]$$

The new survivor sequence $S_i$ is formed based on this metric selection. For example, if the winning path is the one that includes path m (and hence branch mi), the new survivor sequence at node i is formed by concatenating $S_m$ (k−1) and $b_{mi}$.

$$S_i(k)=[S_m(k-1),b_{mi}]$$

The procedure outlined above is easily extended to the case in which more than one input sample is processed at once.

Implementation Considerations—Path Metric Normalization

One problem with the path metric calculations is the continued growth of the path metrics as time unfolds. Many techniques exist to keep the metrics bounded. The present invention preferably employs the race track method, wherein modulo $2^N$ arithmetic is used for all metric calculations (see for example C. B. Shung et al, VLSI Architectures for Metric Normalization in the Viterbi Algorithm, Proceedings 1990 IEEE International Conference on Communications). This is most easily illustrated by example.

Suppose we have two signed integers a and b that are represented as 10-bit two's complement numbers (i.e., using Cirrus Logic notation, these are s9.0 quantities).

In this case, N is 10, and the modulus M for arithmetic operations is $M=2^{10}=1024$.

First, consider the add operation. For ordinary arithmetic, 11 bits would be required to represent the sum of two 10-bit numbers. A simple (but impractical) hardware implementation might use 10 full-adder (FA) cells connected in a ripple-carry fashion, and the sum would be $[c_{10}, s_9, s_8 \ldots s_1 s_0]$, where $c_{10}$ is the carry-out from the most significant FA cell, and $s_i$ is the sum from the $i^{th}$ FA cell. For two's complement addition, $c_{10}$ is the sign bit of the s10.0 sum.

For example, suppose we have the s9.0 numbers a=347= 01 0101 1011b and b=285=01 0001 1101b. The sum is 01 0101 1011 347
  01 0001 1101 285
 (0) 10 0111 1000 632
  $C_{10}$ $S_9$ Note that we must consider the carry-out of the result to be the sign bit in order to get the correct result for ordinary arithmetic. However, if we discard the carry-out bit, and instead consider the next most significant bit to be the sign bit, we get 10 0111 1000b=−392. Hence, the sum has wrapped and become negative. In effect, by retaining only 10 bits, we have actually performed a modulo $2^{10}$ addition of the two operands. That is, 632 and −392 are congruent modulo 1024.

$$632 \equiv -392 \pmod{1024}$$

Carrying this a step further, suppose we now subtract two such numbers, again retaining only N bits. We would like the resulting sign bit to be the same as would have been the case had we done ordinary additions followed by an ordinary subtraction. This is vital, since the sign bit is used in the hardware realization to select the smaller of the two competing metrics during the ACS operation. What restrictions must the two operands satisfy in order to get the correct sign in the final result?

First, consider ordinary subtraction. Suppose that we have two N-bit candidate metrics $L_A$ and $L_B$ such that $$L_A - L_B > 0$$

If we use a two's complement representation of these numbers, the sign bit of the difference will be 0, and $L_B$ will be selected by the hardware. Suppose that we would like to retain only N bits in the result, and not N+1. Clearly, the MSB (sign bit) of our N-bit result is 0 iff $$L_A - L_B < 2^{(N-1)}$$

For example, if we have s9.0 operands (i.e., N=10) the difference between two metrics must be less than 512 in order for this scheme to work. Similar reasoning applies for $L_A - L_B < 0$.

Now suppose that the candidate path metrics have themselves been calculated modulo $2^N$. That is, we have s(N−1).0 quantities $L'_A$ and $L'_B$, such that $$L'_A = L_A \bmod 2^N$$

$$L'_B = L_B \bmod 2^N$$

If $L_A - L_B > 0$, we require that $L'_A - L'_B > 0$.

$$L_A - L_B = L'_A + k \cdot 2^N - (L'_B + l \cdot 2^N)$$

for integers k and l. But we stipulated previously that $L_A - L_B < 2^{N-1}$. Hence, we can calculate the remainder of each side modulo $2^N$ without affecting the signs, and $$L_A - L_B > 0 \Leftrightarrow L'_A - L'_B > 0$$

In summary, we can use wrapped length-N path metrics as long as $$|L_A - L_B| < 2^{N-1}$$

Example: s9.0 Path Metrics
$L_A = 632$
$L_B = 556$
$L'_A = -392$
$L'_B = -468$
$L_A - L_B = 76 > 0$
$L'_A - L'_B = 76 > 0$

Implementation Considerations—Path Metric Scaling

In order to represent branch and path metrics efficiently, it is helpful to scale them first. Assume that we have a compound branch that connects states j and i, and passes though an intermediate state m. Its branch metric is:

$$e_{ji}(k) = d^2_{jm} - 2d_{jm}r(k-1) + d^2_{mi} - 2d_{mi}r(k)$$

where $d_{jm}$ and $d_{mi}$ are elements of $\{-16, -8, 0, 8, 16\}$; r(k−1) and r(k) are s5.0 values. It is clear that the terms containing d must be integer multiples of 16. Therefore, we can reduce the word length of the result by 4 bits without loss of precision if we scale both the r and d values by ¼. With this scaling, simulation has shown that 1024 can be used as the modulus for the path metric arithmetic.

Implementation Considerations—Survivor Sequence Handling

Left unchecked, the survivor sequence concatenation described above would create ever longer sequences. To avoid this, and to avoid indefinite detector delay, some method must be used to keep these sequences finite. The preferred method used in the present invention is simply to truncate the sequences to a fixed length, P. That is, the path memory in which the survivor sequences are stored is only P entries deep. In truncating the survivor sequences to finite length, we can no longer guarantee optimality, but we can make our estimate arbitrarily close to optimal by choosing a sufficiently long path memory.

This technique works because the survivor paths from which we will ultimately choose a winner converge to a common path if we look far enough back in time (relative to the current time k). For example, for the full 6-state VA, if we examine the six survivor paths at times k−1, k−2, etc., we generally see six distinct paths. As we look farther back into time, however, we find that the six paths have begun to merge to fewer than six. If we look far enough back, we see only a single path. The six survivor paths are just offshoots of this common path.

The implication is that it is unnecessary to sort the path metrics to determine the winning sequence. It is sufficient simply to choose a state (state 0, for instance) and its associated survivor sequence. We draw the oldest element of this sequence from the path memory and send it to the output of the detector. After having done this, we manipulate the most recent P−1 rows of the path memory as dictated by the outcome of the latest ACS operation: the six sequences of length P−1 are concatenated with the six most recent NRZ values. This involves the following steps.

If the new state i has more than one incoming branch, the computed candidate path metrics are compared, and one of the incoming paths becomes the survivor. If there is only a single incoming path, no comparison is necessary.

The "old" survivor sequence is then associated with its "new" state i. If we think of the path memory as consisting of 6 rows and P columns, with the most recent NRZ values in the left-most column, this means that the survivor sequence that had previously occupied row j is moved to row i, while at the same time being shifted to the right by one column.

The oldest bit of this sequence exits the path memory. If i=0, this bit is sent to the detector output. Otherwise, it is discarded.

The winning NRZ value of the ACS operation $b_{ji}$ is pushed into the left-most position of row i.

The above steps are then repeated for the remaining rows (i=1 through 5), completing the update of the left-most (most recent) column of the path memory.

One way to think of the path memory is that it is a "generalized FIFO". One possibility for the hardware implementation is to include muxes between each column of the path memory to facilitate swapping of the rows as the contents are shifted to the right.

The preferred length of the path memory for the present invention is 32.

Modifications to the Basic 6-State Sequence Detector

The preferred sequence detector used in the present invention has two further extensions to the ideas presented above. It incorporates folding (also called state sharing), and it processes two samples at once, instead of just one.

Multiple Samples at Once

In principle, any number of samples can be processed at once. After all, the objective is to choose the path with the minimum cumulative length. For example, if we process N samples at once, each of the possible paths connecting state j to state i has $$L_i(k) = L_j(k-N) + \sum_{n=0}^{N-1} e^{(A)}(k-n)$$

a metric of the following form:

where the branch metrics $e^{(A)}$ are those associated with the particular path A. The second step of the algorithm is then to select the shortest candidate from among all the possibilities. But how many possible paths are there? For this trellis, the number of allowable paths as a function of path length N is a generalized Fibonacci sequence:

$$F_N = F_{N-1} + F_{N-3}$$

where the first three terms of the sequence are $F_1=8$, $F_2=12$, and $F_3=18$. That is, the number of paths grow exponentially with increasing N. A related measure of hardware cost is the number of ACS states. Beyond N=2, all states are ACS states with two or more inputs.

Figure 7:
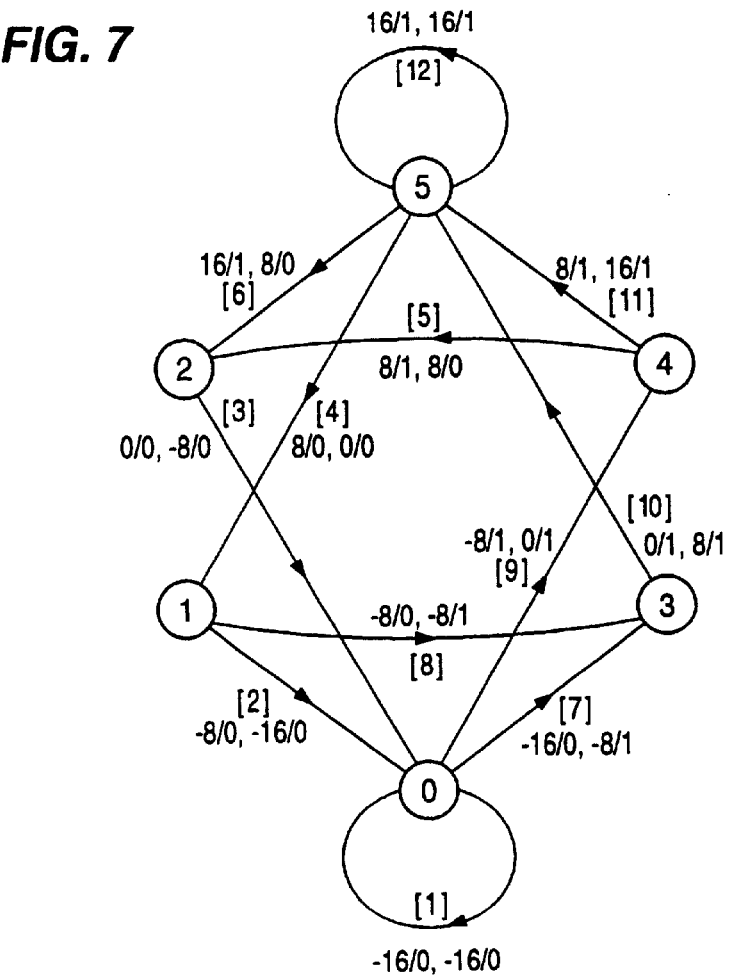
FIG. 7 is state diagram for a dual sample per update Viterbi sequence detector in accordance with the preferred partial response target of the invention.

In summary, processing multiple samples at once complicates the topology of the graph, as well as increasing the computational burden. Clearly, we would like to avoid multiple-sample processing if possible. In order to support higher data rates, the present invention processes two input samples during each update cycle. This state transition diagram is shown in FIG. 7. As above with respect to FIG. 5, states are referred to by the state number within the circle representing the state. Branches are annotated with expected input to cause the corresponding transition and output generated by the transition. It should be noted that multiple transitions are associated with each path. Further processing discussed herein below determines the branches taken and the output generated by the two sample at a time detector. For further reference herein, each branch is referred to by a number in square brackets (i.e., [1] . . . [12]). We now have 12 branches instead of 8, and 4 ACS states instead of 2. Also note that the ACS units for states 0 and 5 have three incoming branches, further complicating the hardware design.

Consider the ACS computation for state 3. There are two incoming branches, one from state 1 ([8]), and one from state 0 ([7]). From the single-step trellis shown in FIG. 6, we see that the compound branch connecting states 1 and 3 is made up of the simple branches from 1 to 0, and from 0 to 3. Hence the composite branch metric for this branch is:

$$e_{13}(k) = d_{10}^2 - 2d_{10}r(k-1) + d_{03}^2 - 2d_{03}r(k)$$

The path metric for the candidate path that passes through state 1 is just $$L_{3,1}(k) = L_1(k-2) + e_{13}(k)$$

The metric for the other candidate path (the one passing through state 0) is $$L_{3,0}(k) = L_0(k-2) + e_{03}(k)$$

As before, the smaller of the two is selected.

$$L_3(k) = \min[L_{3,1}(k), L_{3,0}(k)]$$

Folding the Machine—Reduced State Sequence Estimation

To reduce hardware complexity, it is advantageous to group the states of the full machine into a smaller number of superstates (also called hyperstates). The resulting state machine is often called a folded machine because it resembles what would result if the original graph were folded back onto itself along some line of symmetry. The advantage of folding the machine is that it reduces the amount of computation required at each update, since there are both fewer states and fewer branches. If the states are inappropriately grouped into superstates, however, $d_{min}$ can be degraded, resulting in performance loss.

The sequence detector of the present invention is preferably folded in the following way.

TABLE 1

| Shared States | Superstate |
|---|---|
| 0, 5 | A |
| 2, 3 | B |
| 1, 4 | C |

Figure 9:
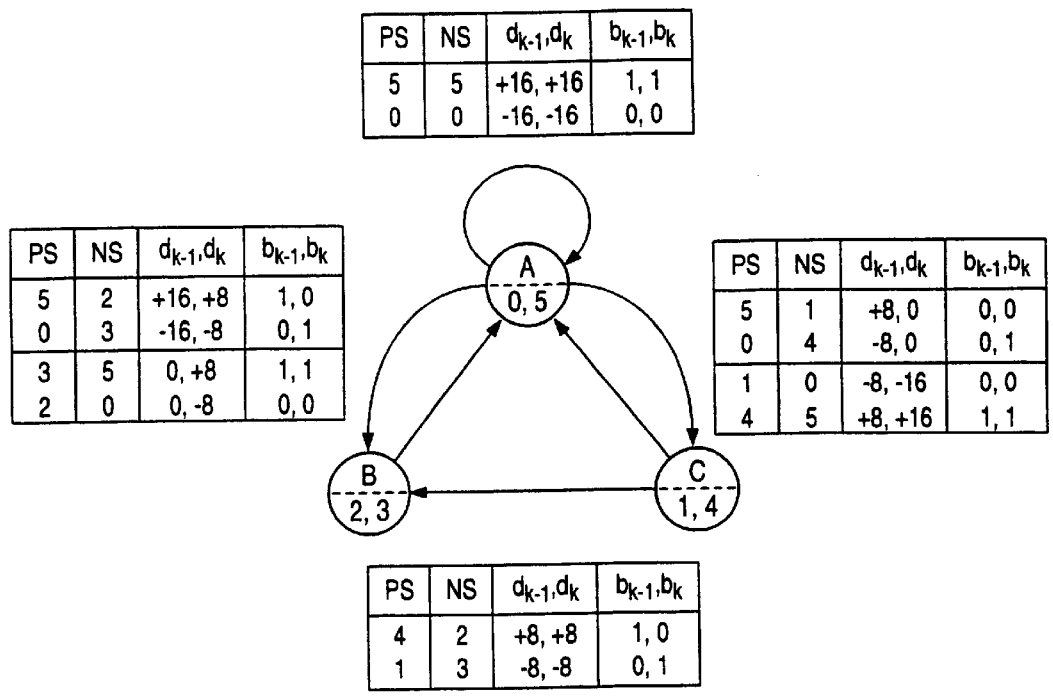
FIG. 9 is a superstate diagram for a dual sample per update Viterbi sequence detector in accordance with the preferred partial response target of the invention.
Figure 10:
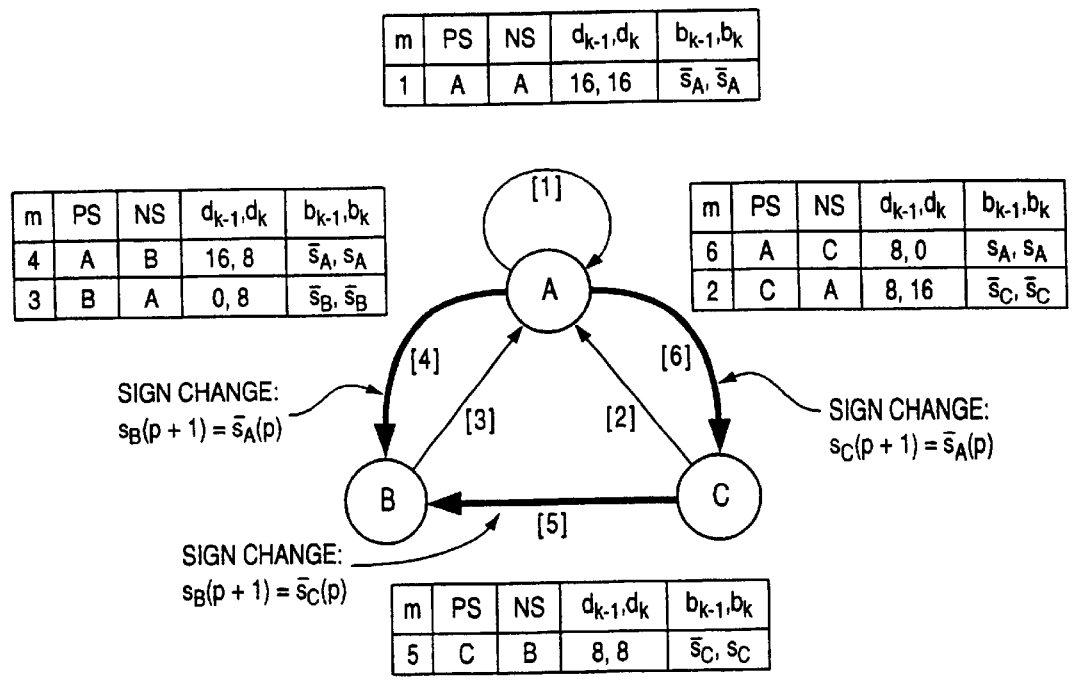
FIG. 10 is a superstate diagram including sign logic for a dual sample per update Viterbi sequence detector in accordance with the preferred partial response target of the invention.

The folded, two-sample-at-once state machine is shown in FIGS. 9 and 10. For illustration purposes, FIG. 9 shows the branch information in terms of the original machine. This is an intermediate step in constructing the final state machine of FIG. 10.

In the folded graph of FIG. 10, we must keep track of which state is being represented by a particular superstate at each update time (e.g., superstate A can represent either state 0 or 5, but not both at once). Because of the way the states have been grouped into superstates, this information is carried by the signs of the branch weights.

Figure 8A:
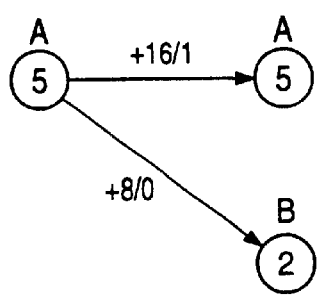
FIG. 8A and 8B are exemplary state diagrams representing superstates of FIG. 7.
Figure 8B:
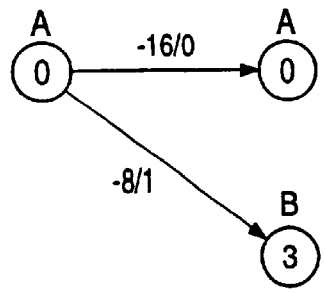

For example, consider superstate A as shown in FIGS. 8A and 8B. If the sign of the exiting branch weights is (+), superstate A currently represents state 5 as in FIG. 8A. If it is (−), superstate A represents state 0 as in FIG. 8B.

Close inspection of FIG. 9 reveals that as superstate A is entered, it always inherits the sign of the originating state. As superstate B or C is entered, however, the new sign is the inverse of the sign of the originating state. Hence, three of the possible state transitions result in sign changes, and three do not. Furthermore, if we represent (+) as 0 and (−) as 1 (as in a two's complement number system), the output samples $b_k$ and $b_{k-1}$ for a given branch are directly related to its sign. This information is summarized in FIG. 10. Note that heavy lines are used in this figure to highlight the branches that result in a sign change (i.e., branches [4], [5] and [6]).

One subtlety of this figure is that we now have two indices: k is the time index, and p is the update index. Since we are processing two samples at each update, we have $$p=\lceil (k+1)/2 \rceil -1$$

Note that this expression is for illustration purposes only and ignores any pipelining that may be done in the hardware realization.

Exemplary Preferred Implementation

An exemplary preferred embodiment of the Viterbi algorithm is presented in this section. Because of the various constraints (design choices) under which the designer must work, the final hardware realization may differ from this example in some of the details. Those skilled in the art are familiar with such design choices.

Sequence Detector Clock Frequencies

From an algorithmic point of view, there are two indices associated with the various data sequences in the Viterbi algorithm. The time index has been called k, and the VA update index has been called p (e.g., see equations above). In the hardware implementation, the counterparts of k and p are CLKD and CLKV, respectively.

The detector clock (CLKD) is supplied by the retiming block (not shown). This clock is phase locked to the channel symbols, and in general, its frequency is incommensurate with that of the fixed ADC clock. The detector clock (CLKD) is divided by 2 locally to produce CLKV, the VA update clock. Each Viterbi update cycle begins and ends with a rising edge of CLKV. In the actual implementation, it may prove beneficial to use both edges of CLKV, or equivalently, every CLKD edge. This is an implementation design choice.

Viterbi Algorithm Block Diagram

Figure 11:
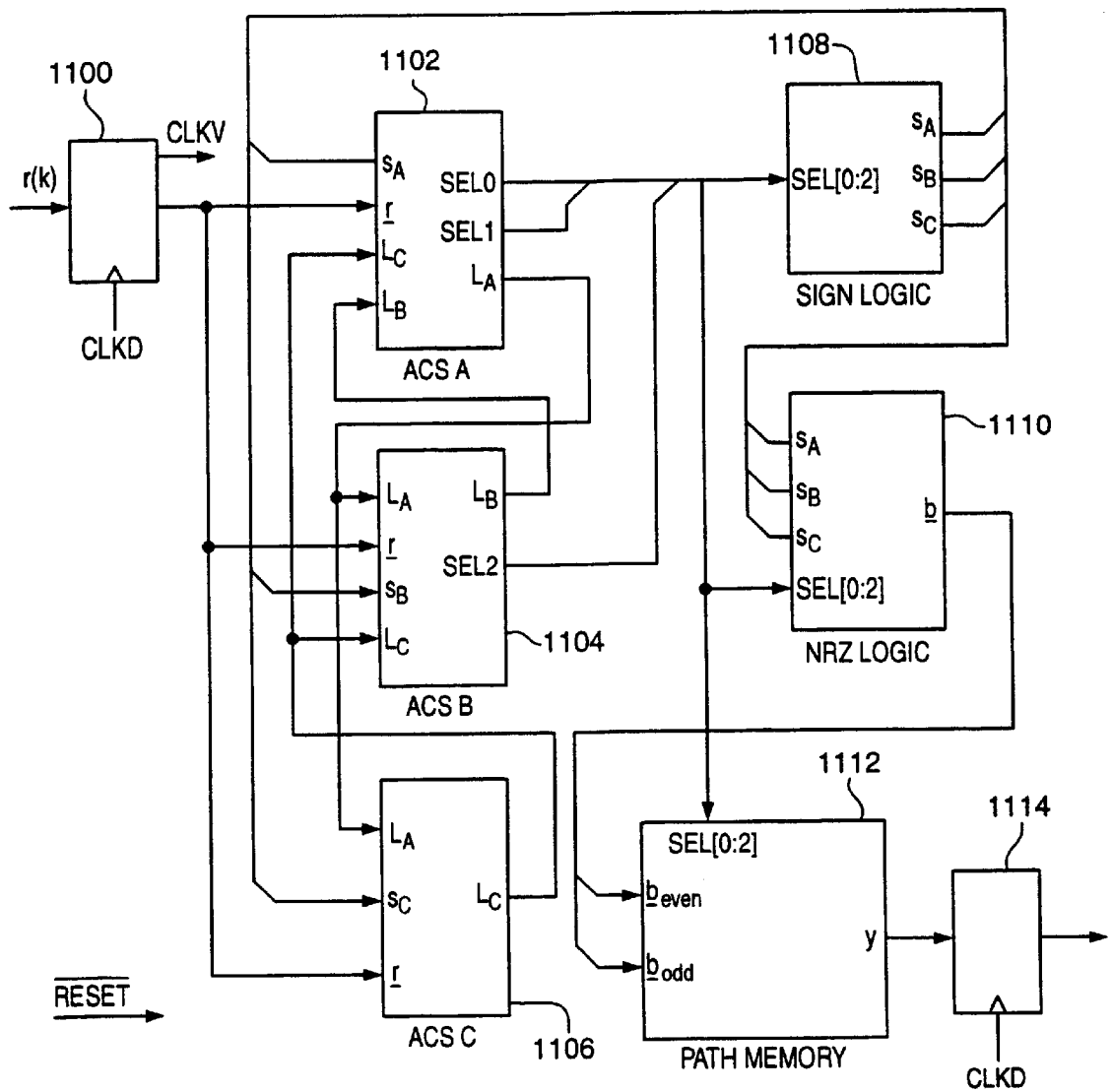
FIG. 11 is a block diagram of the Viterbi sequence detector of the present invention.

An exemplary preferred embodiment of the Viterbi detector of the present invention is shown as a block diagram in FIG. 11. The critical paths are those associated with the processing of the path metrics in the ACS units. We assume in this example that only two additions and a comparison (i.e., subtraction) can be completed during a CLKV cycle.

Element 1100 performs a serial to parallel conversion of the input samples received as input to the Viterbi detector. Two sequential sample values are received and presented to the remaining logic of the Viterbi detector (namely r(k−1) and r(k)). These input values are applied to each of three Add-Compare-Select (ACS) logic units, one for each superstate (A, B and C). ACS A 1102 performs add, compare and select operations for superstate A. In like manner, ACS B 1104 and ACS C 1106 performs related operations for superstates B and C, respectively. Details of the operation of each ACS element are provided herein below.

Outputs of the ACS elements are fed back to other ACS units for their respective operations. Other output values are applied to sign logic element 1108 to determine the sign of the relative path metrics determined by the ACS elements and to NRZ logic element 1110 to determine the decoded NRZ data corresponding to the encoded sequences recognized by the ACS elements. The sign value associated with each superstate is applied back to the ACS elements for their respective operations and to NRZ logic element 1110. Path memory element 1112 stores recognized output sequences and applies them to parallel to serial converter 1114 to generate decoded output values. Further details of the operation and design of each of these elements is provided herein below.

Add-Compare-Select Logic

Figure 12:
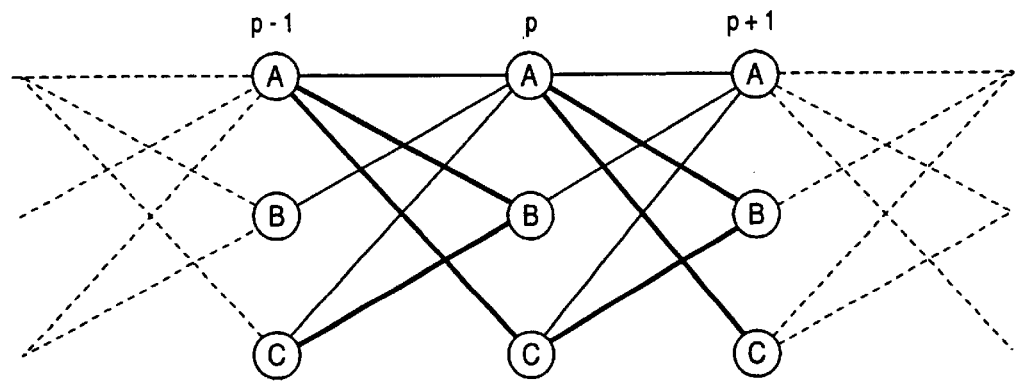
FIG. 12 is a trellis diagram for the 3-state folded Viterbi sequence detector of FIG. 11.

The trellis for the folded, two-sample-at-once VA is shown in FIG. 12. As before, the state transitions that result in a sign change are indicated with a heavy line.

It is evident from this figure that superstate A has three incoming (candidate) paths. These are just the extensions of the survivor paths for superstates A, B and C at index p−1. The role of the associated Add-Compare-Select (ACS) unit is then to:

Calculate the path metrics for each of the three candidate paths

Select the path with the lowest metric

Save this value for the next update cycle

Generate control signals for the Sign Logic, NRZ Logic and Path Memory (discussed below).

Figure 13:
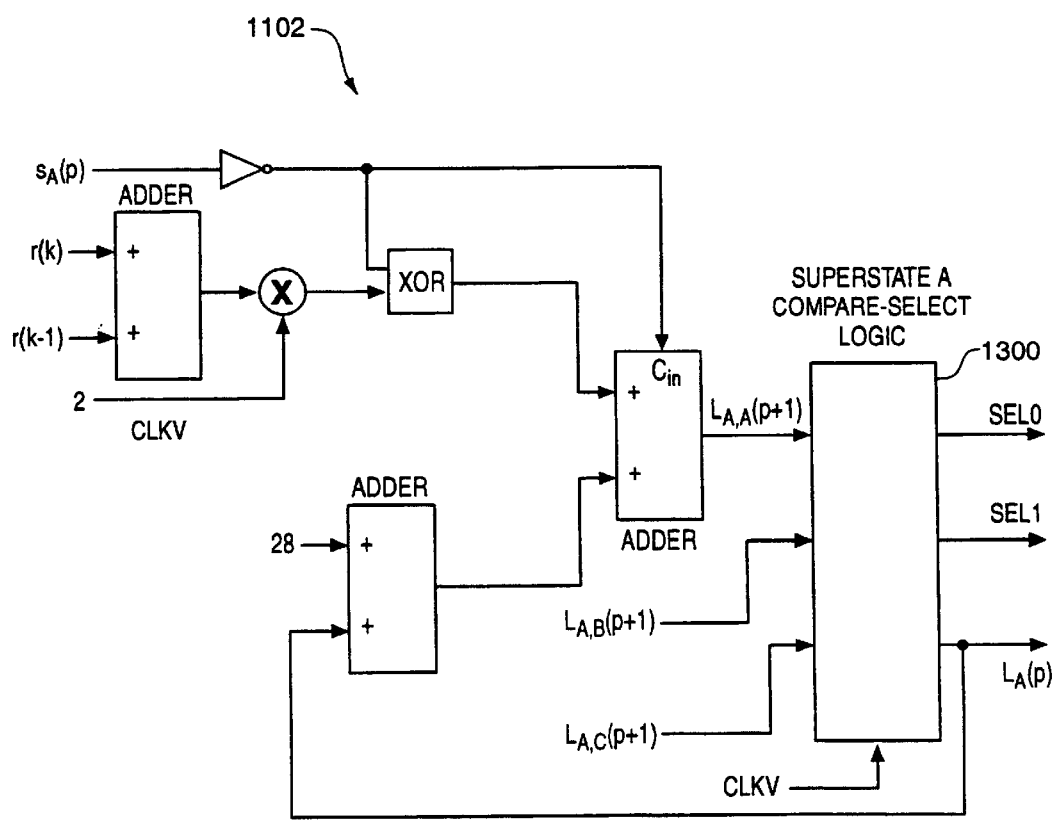
FIG. 13 is a block diagram of superstate A Add-Compare-Select logic of the Viterbi sequence detector of FIG. 11.
Figure 14:
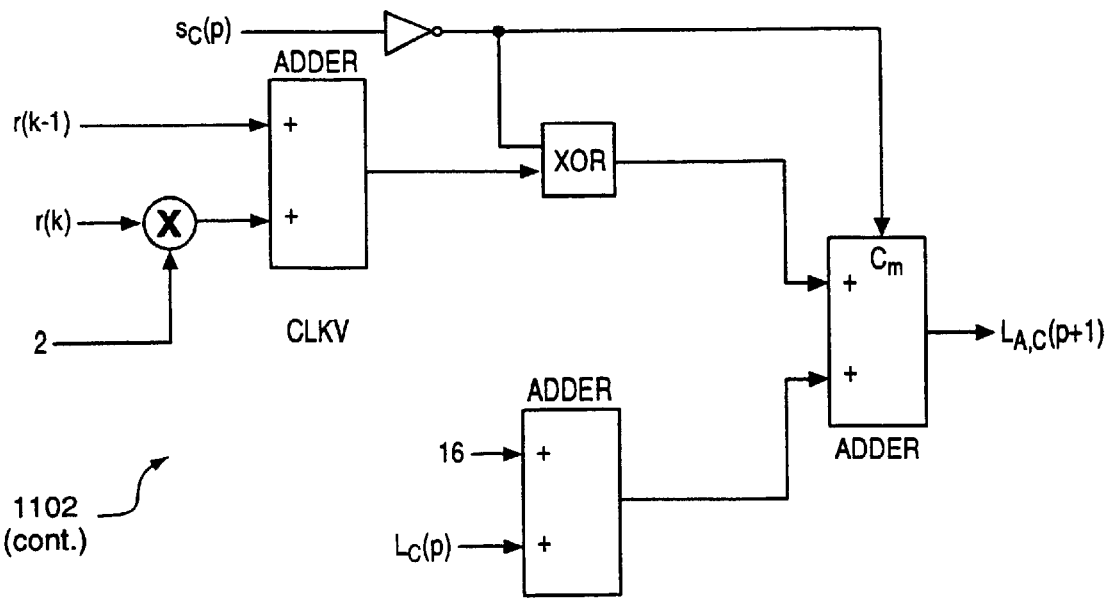
FIG. 14 is a block diagram of more of superstate A Add-Compare-Select logic of the Viterbi sequence detector of FIG. 11.
Figure 15:
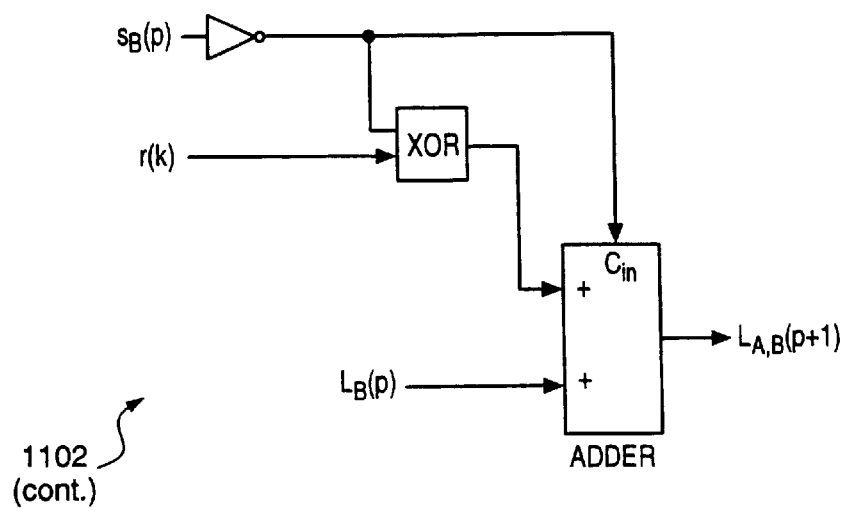
FIG. 15 is a block diagram of still more of superstate A Add-Compare-Select logic of the Viterbi sequence detector of FIG. 11.
Figure 16:
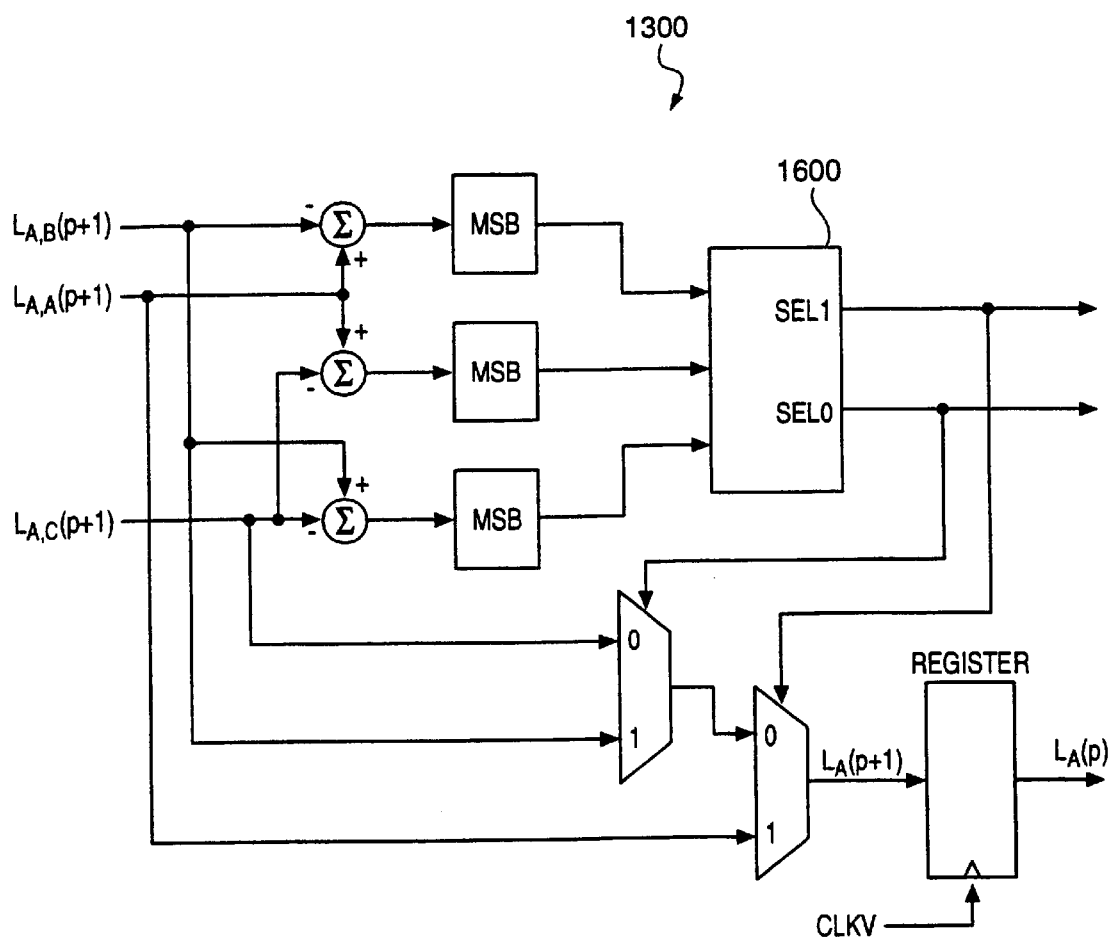
FIG. 16 is a block diagram of superstate A Compare-Select logic of FIG. 13.

FIGS. 13, 14 and 15 provide additional details of the operation and design of ACS A 1102 of FIG. 11. FIG. 16 provides additional detail of the operation and design of Compare-Select logic element 1300 of FIG. 13.

Figure 17:
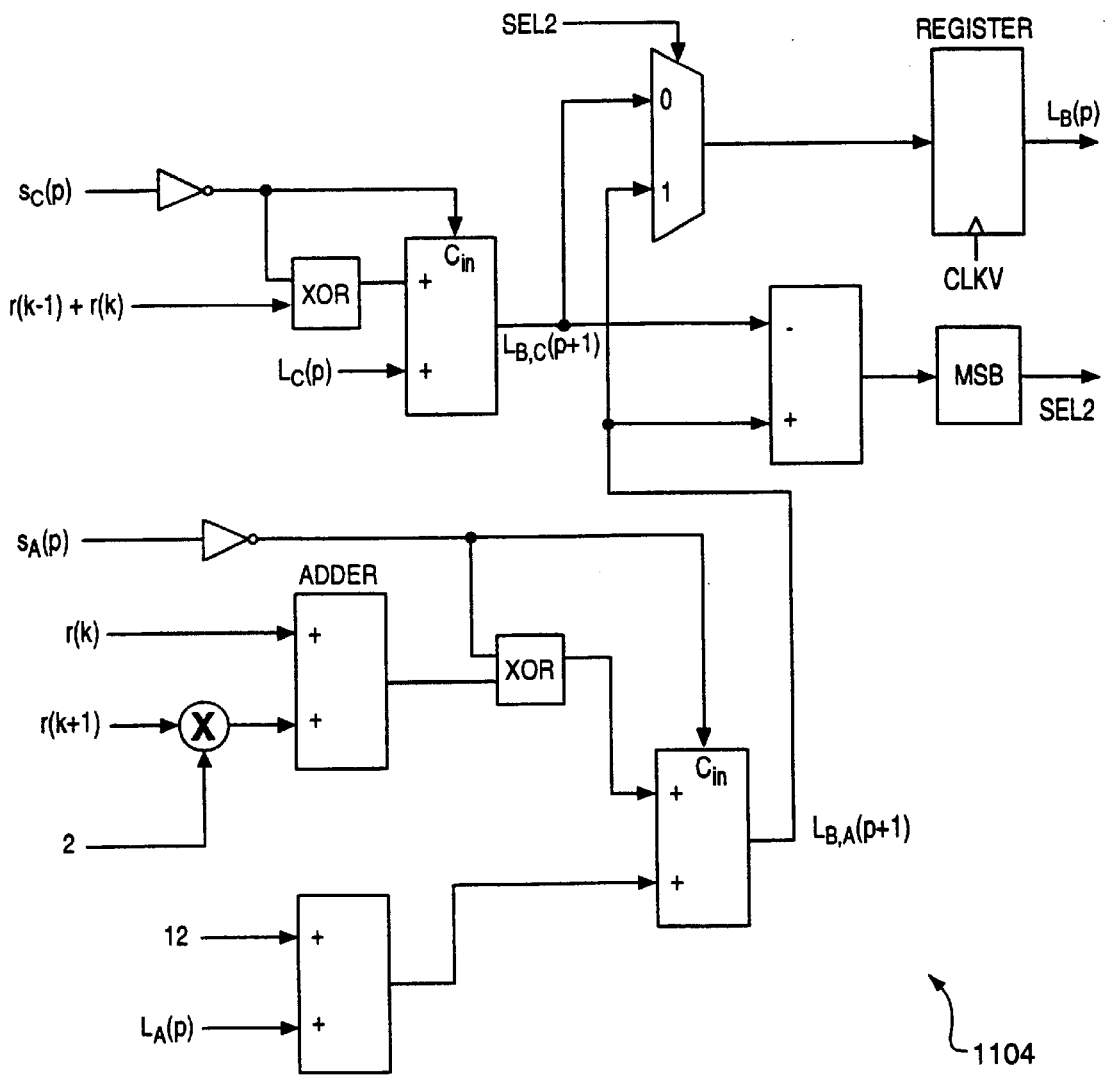
FIG. 17 is a block diagram of superstate B Add-Compare-Select logic of the Viterbi sequence detector of FIG. 11.
Figure 18:
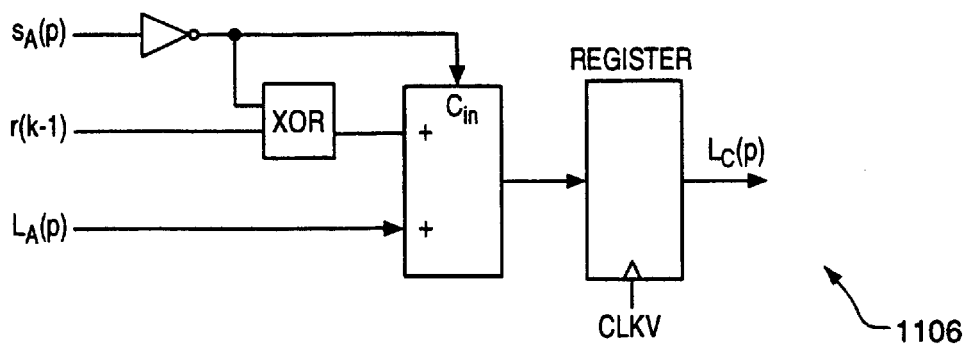
FIG. 18 is a block diagram of superstate C Add-Compare-Select logic of the Viterbi sequence detector of FIG. 11.

The ACS unit for superstate B (ACS B 1104 of FIG. 11) is considerably simpler and depicted in FIG. 17. Since there are only two candidate paths entering this superstate. Superstate C has only one incoming path, and has what might be called a degenerate ACS shown in FIG. 18 (ACS C 1106 of FIG. 11). It merely calculates and stores the new path metric for superstate C-- there are no compare and select operations.

Consider the candidate paths entering superstate A at index p. Let $L_{A,j}$ (p) be the cumulative metric for the candidate path that passes through superstate j, where j ∈ {A, B, C}. That is $$L_{A,j}(p) = L_j(p-1) + e_{jA}(p)$$

$L_j(p-1)$ is the cumulative metric for the path that visits superstate j at index, and $e_{jA}(p)$ is the metric for the branch from superstate j to superstate A at index p.

The metrics associated with the three candidate paths are $L_{A,A}$ (p), $L_{A,B}$ (p) and $L_{A,C}$ (p). Suppose we rank the metrics in descending order. If we consider the pair-wise differences of $L_{A,A}$ (p), $L_{A,B}$ (p) and $L_{A,C}$ (p), we can construct the following table. To make the table more concise, we will abbreviate the metric names using only the name of the superstate at index p−1. That is, in this table 2, we will make the following substitutions:

$L_{A,A}(p) \rightarrow A$
$L_{A,B}(p) \rightarrow B$
$L_{A,C}(p) \rightarrow C$ The first three columns of this table show the possible outcomes of the pair-wise metric comparisons (i.e., the MSBs of the respective subtractions). The last two columns are the resulting control signals SEL0 and SEL1. These signals control muxes Path Memory, Sign Logic and NRZ Logic.

TABLE 2

| msb(A–B) | msb(A–C) | msb(B–C) | Ranking | Winner | SEL1 | SEL0 |
|---|---|---|---|---|---|---|
| 0 | 0 | 0 | ABC | C | 0 | 0 |
| 0 | 0 | 1 | ACB | B | 0 | 1 |
| 0 | 1 | 0 | illegal | illegal | 0 | 0 |
| 0 | 1 | 1 | B | B | 0 | 1 |
| 1 | 0 | 0 | BAC | C | 0 | 0 |
| 1 | 0 | 1 | illegal | illegal | 0 | 0 |
| 1 | 1 | 0 | BCA | A | 1 | 0 |
| 1 | 1 | 1 | CBA | A | 1 | 0 |

The following figures show a preferred exemplary embodiment of the ACS unit for superstate A.

Referring to the tables in FIG. 10, and scaling by $\frac{1}{16}$, we have, $$L_{A,A}(p+1) = L_A(p) + 32 - \sigma_A(p) \cdot 2 \cdot [r(k+1) + r(k)]$$

$$L_{A,B}(p+1) = L_B(p) + 4 - \sigma_B(p) \cdot r(k)$$

$$L_{A,C}(p+1) = L_C(p) + 20 - \sigma_C(p) \cdot [r(k-1) + 2 \cdot r(k)]$$

Since we are using s as a Boolean variable in the hardware design, we have substituted σ in the above expressions to represent the sign information from the previous update cycle. That is $$s=0 \Leftrightarrow \sigma=1$$

$$s=1 \Leftrightarrow \sigma=-1$$

Since we are only interested in the differences between candidate metrics, we can reduce the hardware complexity slightly by subtracting 4 from the right-hand sides of the above equations.

$$L_{A,A}(p+1) = L_A(p) + 28 - \sigma_A(p) \cdot 2 \cdot [r(k+1) + r(k)]$$

$$L_{A,B}(p+1) = L_B(p) - \sigma_B(p) \cdot r(k)$$

$$L_{A,C}(p+1) = L_C(p) + 16 - \sigma_C(p) \cdot [r(k-1) + 2 \cdot r(k)]$$

Multiplication by 2 in these equations can be implemented the same way as in the prefilter (see above). Also, recall that the final values of the candidate metrics are not saturated, but are allowed to wrap in order to implement the desired modulo 1024 arithmetic.

For superstate B, the logic is simpler. There are only two candidate paths, and the associated path metrics are $L_{B,A}$ and $L_{B,C}$. Again using the appropriate tables from FIG. 10, we have $$L_{B,A}(p+1) = L_A(p) + 20 - \sigma_A(p) \cdot [2 \cdot r(k-1) + r(k)]$$

$$L_{B,C}(p+1) = L_C(p) - \sigma_C(p) \cdot [r(k-1) + r(k)]$$

In order to be consistent with the superstate A equations, we must subtract 4 from the right-hand sides.

$$L_{B,A}(p+1) = L_A(p) + 16 - \sigma_A(p) \cdot [2 \cdot r(k-1) + r(k)]$$

$$L_{B,C}(p+1) = L_C(p) - \sigma_C(p) \cdot [r(k-1) + r(k)]$$

Note that the term above has already been formed in the superstate A hardware and can be reused here. There is only one comparison to be performed in this ACS unit, and one resulting control signal SEL2.

$$SEL2 = msb[L_{B,A}(p) - L_{B,C}(p)]$$

The superstate C update equation is $$L_C(p+1) = L_A(p) + 4 - \sigma_A(p) \cdot r(k-1)$$

Again, we must subtract 4 from the right-hand side.

$$L_C(p+1) = L_A(p) - \sigma_A(p) \cdot r(k-1)$$

Sign Logic

Figure 19:
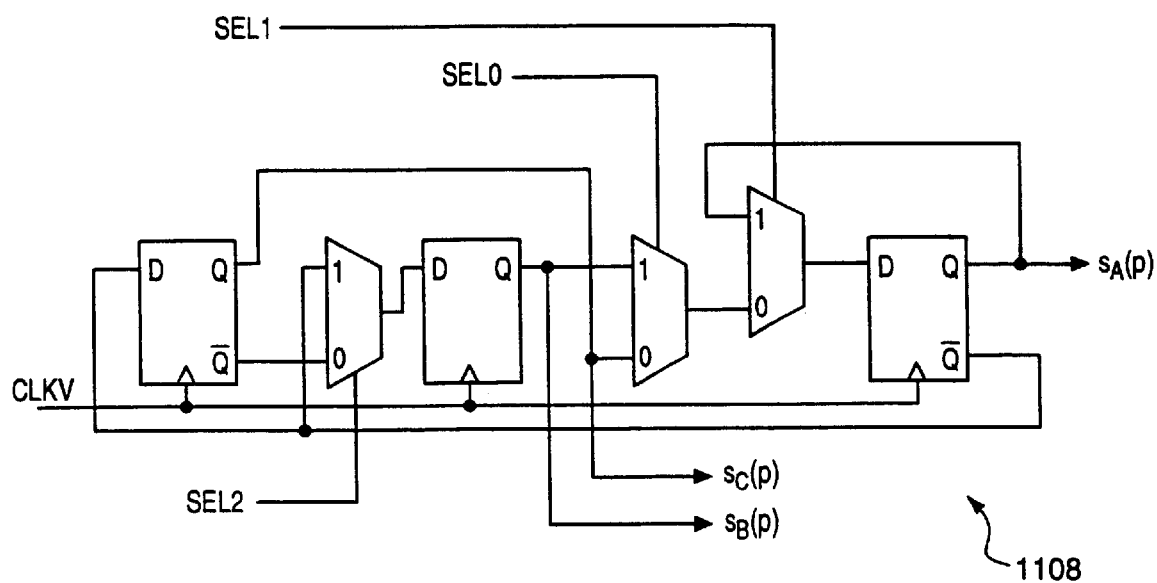
FIG. 19 is a block diagram of the sign logic of the Viterbi sequence detector of FIG. 11.

As illustrated in FIG. 10, an aspect of the present invention is the manner in which the sign information is managed. This section presents an exemplary embodiment of the Sign Control Logic (1108 of FIG. 11). FIG. 19 depicts such an exemplary preferred embodiment of sign control logic.

NRZ logic

Figure 20:
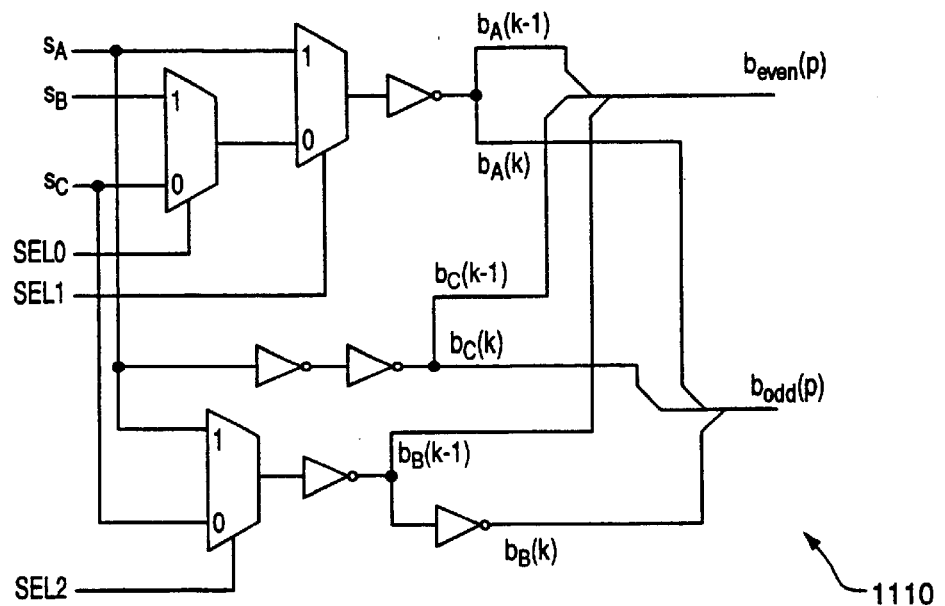
FIG. 20 is a block diagram of the NRZ logic of the Viterbi sequence detector of FIG. 11.

Recalling that the NRZ outputs are directly related to the signs, we can construct the logic (NRZ logic 1110 of FIG. 11) as shown in FIG. 20.

Path memory

In principle, the path memory (1112 of FIG. 11) is an array of 3 rows by P columns whose purpose is to perform the following concatenation operation for all superstates i ∈{A, B, C}.

$$S_i(p) = [\hat{S}_j(p-1), b_{ji}(k-1), b_{ji}(k)]$$

where $\hat{S}_j(p-1)$ is just the vector of NRZ values associated with superstate j at the previous update step, truncated to length P−2. The two oldest elements of $S_j(p-1)$ exit the path memory as part of the concatenation process.

Each row of the path memory corresponds to a superstate and each column corresponds to a time index. Since the sequence detector of the present invention processes two samples at once, the path memory is updated only on every other CLKD rising edge (or alternatively, on every CLKV rising edge). That is, each time the path memory is updated, two new samples enter, and two old samples are moved to the detector output circuitry.

Two implementations are suggested to achieve this purpose. One approach is to utilize a single path memory. As an alternative, and perhaps more efficient design choice, another approach is to utilize two path memories each of half the desired length. A first of the dual path memories is used for even samples and the other is used for odd samples. Though this latter approach is disclosed herein and believed to provide some efficiencies, both design choices will perform the desired purpose.

Figure 21:
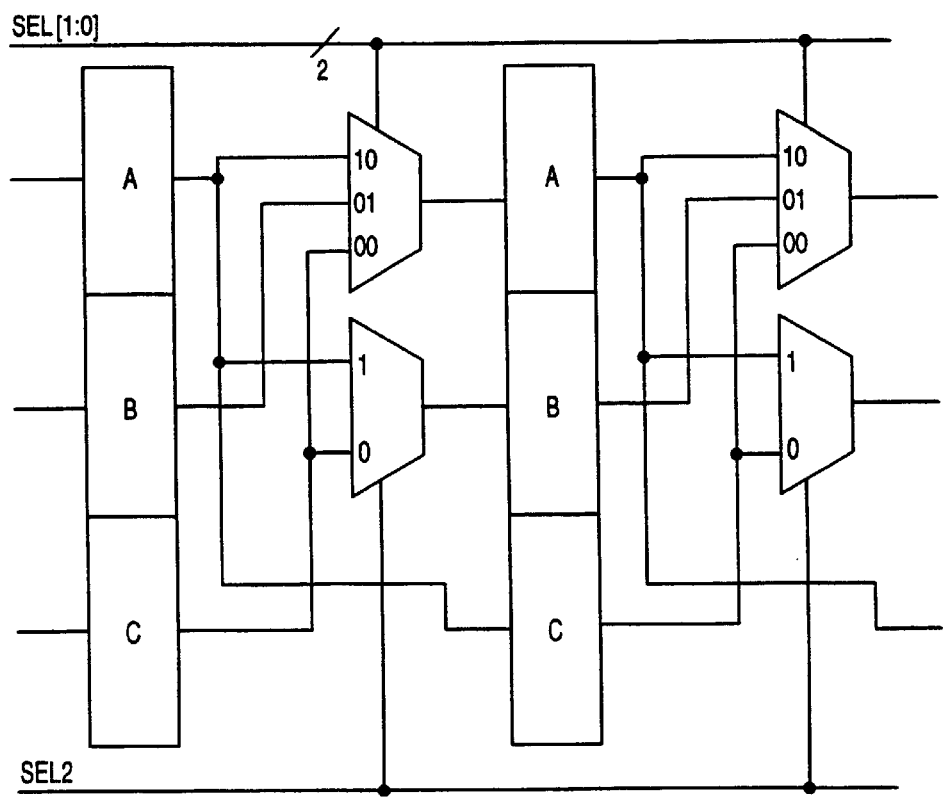
FIG. 21 is a block diagram of the path memory segment for even time index samples of the Viterbi sequence detector of FIG. 11.

FIG. 21 is a block diagram of a section of the even path memory. The odd path memory has an identical structure. All storage elements are presumed initialized to zero.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A read channel including:
   a source of a sequence of periodic discrete sampled values from an analog signal source; and
   a sequence detector coupled to said source for detecting sequences of pulses in said sequence of periodic discrete sampled values wherein said sequence detector has a preferred partial response target characterized in that said preferred partial response target is matched to an expected received signal whose power spectral density decreases non-monotonically across the passband when said read channel receives input signals derived from a maxentropic information sequence.

2. The read channel of claim 1 wherein said preferred partial response target is further characterized in that the power spectrum of the partial response target has a spectral null at the Nyquist frequency and is a non-monotonic decreasing function between zero and the Nyquist frequency.

3. The read channel of claim 2 wherein said preferred partial response target is further characterized in that the power spectrum of the partial response target has a spectral null at the Nyquist frequency and has a relative minimum value between zero and the Nyquist frequency.

4. The read channel of claim 3 wherein said preferred partial response target is further characterized in that the power spectrum of the partial response target has a spectral null at the Nyquist frequency and has a second spectral null between zero and the Nyquist frequency.

5. The read channel of claim 4 wherein said preferred partial response target is further characterized in that the power spectrum of the partial response target has a spectral null at the Nyquist frequency and has a second spectral null at one half the Nyquist frequency.

6. The read channel of claim 5 wherein said preferred partial response target is further characterized in that the partial response target is represented in D-transform notation by the polynomial:

$$1+D+D^2+D^3.$$

7. The read channel of claim 1 wherein said sequence detector includes:
   means for processing sequential n-tuples of samples of said sequence of periodic discrete sampled values substantially in parallel.

8. The read channel of claim 1 further comprising:
   waveform reshaping means coupled between said source and said sequence detector for reshaping the waveform represented by said sequence of periodic discrete sampled values prior to processing by said sequence detector, said waveform reshaping means including a frequency selective filter for equalizing said waveform represented by said sequence of periodic discrete sampled values and for processing sequential n-tuples of samples of said sequence of periodic discrete sampled values substantially in parallel.

9. The read channel of claim 8 wherein said waveform reshaping means includes:
   a DC shifter for applying a DC offset value to said waveform represented by said sequence of periodic discrete sampled values.

10. The read channel of claim 9 wherein said DC shifter includes:
    means for processing sequential n-tuples of samples of said sequence of periodic discrete sampled values substantially in parallel.

* * * * *